United States Patent
Igarashi et al.

(10) Patent No.: US 12,384,933 B2
(45) Date of Patent: Aug. 12, 2025

(54) PAINT-PROTECTIVE COATING MATERIAL AND COATING COMPOSITION

(71) Applicant: NITTO DENKO CORPORATION, Ibaraki (JP)

(72) Inventors: Takeshi Igarashi, Ibaraki (JP); Koki Hashimoto, Ibaraki (JP); Eiichi Imoto, Ibaraki (JP); Chihiro Yoshida, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 124 days.

(21) Appl. No.: 18/561,059

(22) PCT Filed: May 13, 2022

(86) PCT No.: PCT/JP2022/020202
§ 371 (c)(1),
(2) Date: Nov. 15, 2023

(87) PCT Pub. No.: WO2022/244695
PCT Pub. Date: Nov. 24, 2022

(65) Prior Publication Data
US 2024/0263033 A1    Aug. 8, 2024

(30) Foreign Application Priority Data

May 17, 2021 (JP) .................................. 2021-082914
Feb. 18, 2022 (JP) .................................. 2022-024082
Apr. 26, 2022 (JP) .................................. 2022-072651

(51) Int. Cl.
C09D 133/06 (2006.01)
C08F 218/08 (2006.01)
(Continued)

(52) U.S. Cl.
CPC ........ *C09D 133/064* (2013.01); *C08F 218/08* (2013.01); *C08F 220/1804* (2020.02);
(Continued)

(58) Field of Classification Search
CPC ............... C09D 133/064; C09D 5/022; C09D 133/062; C09D 5/008; C09D 133/20;
(Continued)

(56) References Cited

U.S. PATENT DOCUMENTS

2003/0045627 A1    3/2003  Rosano et al.
2010/0116432 A1*   5/2010  Uesugi ..................... C09J 7/381
                                                              156/60

(Continued)

FOREIGN PATENT DOCUMENTS

GB    1327030 A      8/1973
JP    60-144369 A    7/1985
(Continued)

OTHER PUBLICATIONS

International Search Report for PCT/JP2022/020202 dated Jul. 19, 2022.
(Continued)

*Primary Examiner* — Michael G Miller
(74) *Attorney, Agent, or Firm* — Sughrue Mion, PLLC (57) ABSTRACT

Provided is a paint-protective coating material formed from a liquid coating composition. The coating composition comprises, as its base polymer, a polymer (A) that is a polymerization product of monomers comprising an acrylic monomer. The paint-protective coating material has a storage modulus at 70° C. of 0.40 MPa or higher and 1.30 or lower, a storage modulus at 23° C. of 250 MPa or higher and 800 MPa or lower, and a storage modulus at −30° C. of 2300 MPa or less.

10 Claims, 1 Drawing Sheet (51) Int. Cl.
*C08F 220/18* (2006.01)
*C09D 5/02* (2006.01)

(52) U.S. Cl.
CPC ......... *C09D 5/022* (2013.01); *C09D 133/062* (2013.01); *C08F 2800/10* (2013.01)

(58) Field of Classification Search
CPC .............. C08F 218/08; C08F 220/1804; C08F 2800/10; B05D 1/325; B05D 2202/10; B05D 7/24; B05D 2502/00
See application file for complete search history.

(56) References Cited

U.S. PATENT DOCUMENTS

| | | |
|---|---|---|
| 2011/0126983 A1 | 6/2011 | Suzuki et al. |
| 2018/0072912 A1 | 3/2018 | Junk et al. |
| 2022/0363940 A1 | 11/2022 | Igarashi et al. |
| 2024/0392051 A1 | 11/2024 | Igarashi et al. |

FOREIGN PATENT DOCUMENTS

| | | |
|---|---|---|
| JP | 06-073261 A | 3/1994 |
| JP | 7-126572 A | 5/1995 |
| JP | 2004-224874 A | 8/2004 |
| JP | 2008-274153 A | 11/2008 |
| JP | 2010-126666 A | 6/2010 |
| JP | 2011-111552 A | 6/2011 |
| JP | 2016-008298 A | 1/2016 |

OTHER PUBLICATIONS

Extended European Search Report dated Oct. 21, 2022 in European Application No. 22172998.1.
Suresh et al., "Effect of Copolymer Composition on the Dynamic Mechanical and Thermal Behaviour of Butyl Acrylate-Acrylonitrile Copolymersa", Macromolecular Materials and Engineering, 2003, vol. No. 288 No. 12, p. 980-988 (9 pages).
International Search Report for PCT/JP2022/020201 dated Jul. 19, 2022.
Non-Final Office Action issued Feb. 7, 2025 in U.S. Appl. No. 17/745,173.

* cited by examiner

PAINT-PROTECTIVE COATING MATERIAL AND COATING COMPOSITION

CROSS REFERENCE TO RELATED APPLICATIONS

This application is a National Stage of International Application No. PCT/JP2022/020202 filed May 13, 2022, claiming priority based on Japanese Patent Application No. 2021-082914 filed May 17, 2021, Japanese Patent Application No. 2022-024082 filed Feb. 18, 2022 and Japanese Patent Application No. 2022-072651 filed Apr. 26, 2022.

TECHNICAL FIELD

The present invention relates to a paint-protective coating material and a coating composition for forming a paint-protective coating material.

BACKGROUND ART

For purposes such as prevention of surface damage in transporting, storing, aging and constructing articles having paint layers (or painted articles, e.g., painted automobiles and their components, or metal plates such as painted steel plates and molded articles therefrom), techniques are known such as adhering protective sheets to the paint layers for protection. A paint-protective sheet used for such purposes is generally constructed as an adhesively single-faced substrate-supported pressure-sensitive adhesive (PSA) sheet having a PSA layer on one face of a substrate sheet (support substrate) so that it can provide protection when adhered via the PSA to an adherend (an object to be protected). After the protective role is completed, the paint-protective sheet is removed (peeled away) from the adherend. Technical literatures related to paint-protective sheets include Patent Document 1.

CITATION LIST

Patent Literature

[Patent Document 1] Japanese Patent Application Publication No. 2011-111552
[Patent Document 2] Japanese Patent Application Publication No. 2004-224874

SUMMARY OF INVENTION

Technical Problem

When protecting non-flat objects (especially objects having complex three-dimensional shapes such as automobile body shells), it is difficult to increase efficiency in suitable application of paint-protective sheets to the objects. In case of improper application of a paint-protective sheet to an object to be protected, for instance, when the applied paint-protective sheet has wrinkles, the wind may blow into the wrinkles while the post-application object is being stored or transported, thereby peeling off the paint-protective sheet and compromising the intended protection purpose.

On the other hand, it has been suggested to form a protective coat by directly applying a liquid protective coating composition onto the paint layer of an object to be protected and drying the liquid composition on the paint layer. Literatures related to this type of art include Patent Document 2. However, unlike the aforementioned paint-protective sheet, the protective coat thus formed from a liquid composition is free of a substrate; thus, for removal from the paint layer after serving the protective role, it tends to lack sufficient removability. Similar to conventional paint protection sheets, the paint-protective coating material (protective coat formed from a liquid composition) is required to have non-marking properties (i.e., protective coat's non-traceability on paint layers after its removal). However, it has been especially difficult to enhance the removability while preventing marking.

An objective of this invention is thus to provide a paint-protective coating material that is formed from a liquid coating composition and comes with good removability and non-marking properties in removal from a paint layer surface. Another related objective is to provide a coating composition suited for forming the paint-protective coating material and a method for forming the paint-protective coating material.

Solution to Problem

This Description provides a paint-protective coating material (or abbreviated to a "coating material" hereinafter) formed from a liquid coating composition. The coating composition comprises a polymer (A) that is a polymerization product of monomers (a monomer mixture) comprising an acrylic monomer. The paint-protective coating material has a storage modulus at 70° C. (or "G'(70)" hereinafter) of 0.40 MPa or higher and 1.30 MPa or lower. The paint-protective coating material has a storage modulus at 23° C. (or "G'(23)" hereinafter) of 250 MPa or higher and 800 MPa or lower. The paint-protective coating material preferably has a storage modulus at −30° C. (or "G'(−30)" hereinafter) of 2300 MPa or less. Such a paint-protective coating material can bring about good non-marking properties and good removability from paint layers over a broad temperature range in a well-balanced manner.

In some embodiments of the art disclosed herein (including the paint-protective coating material, coating composition, paint protection method, etc.; the same applies, hereinafter), the polymer (A) has a calculated Tg (glass transition temperature calculated based on the composition of the monomers forming the polymer (A) of −20° C. or higher and 0° C. or lower. With the polymer (A) having a calculated Tg in this range, the resulting paint-protective coating material is likely to satisfy the storage moduli at the respective temperatures.

In some embodiments, the polymer (A) has an SP value of 10.0 $(cal/cm^3)^{1/2}$ or higher. The polymer (A) having such an SP value helps obtain a coating material whose peel strength on paint layers is suitably reduced. This is preferable in view of increasing the removability and removal workability.

In some embodiments, the monomers (monomer mixture) preferably include a nitrogen-atom-containing monomer (or "N-containing monomer" hereinafter). In other words, the polymer (A) is preferably a polymerization product of monomers comprising a N-containing monomer. The art disclosed herein can be preferably implemented in an embodiment comprising a polymer (A) formed from monomers having such a composition.

In some embodiments, the polymer-(A)-forming monomers include a monomer ($m_T$) having a homopolymer glass transition temperature of 90° C. or higher and a monomer ($m_L$) having a homopolymer glass transition temperature of −30° C. or lower. Here, the monomer ($m_T$) may include a N-containing monomer (e.g., acrylonitrile). The polymer (A) formed from monomers having such a composition helps obtain a coating material that combines good non-marking properties and good removability from paint layers over a broad temperature range in a well-balanced manner, as well as a coating composition suitable for forming the coating material. In view of helping to obtain a coating material that satisfies the storage moduli at the respective temperatures, the molar ratio ($m_T/m_L$) of the monomer ($m_T$) to the monomer ($m_L$) is, for instance, preferably in the range of 0.60 or higher and 1.50 or lower.

This Description also provides a coating composition used for forming a paint-protective coating material disclosed herein. The paint-protective coating material disclosed herein can be preferably formed, using the coating composition, for instance, by applying the coating composition onto a paint layer and allowing it to dry.

In some embodiments of the art disclosed herein, the coating composition is preferably in aqueous emulsion form where the polymer (A) is dispersed in an aqueous solvent. Such an aqueous emulsion-based coating composition is preferable from the standpoint of environmental hygiene, etc. For instance, it is suited for reducing amounts of organic solvents used and emitted.

This Description provides a paint protection method comprising preparing a coating composition disclosed herein, applying the coating composition to a paint layer of an object to be protected, and drying the coating composition to form a paint-protective coating material that temporarily protects the paint layer. According to the paint protection method, the paint layer can be suitably protected with the coating material. The coating material can also bring about good removability from paint layers and good non-marking properties with a good balance.

In some preferable embodiments, the coating composition is applied with a slot die. By drying the slot-die coated coating composition, a paint-protective coating material can be efficiently formed on the paint layer.

The scope of invention for which patent protection is being sought by this application includes suitable combinations of the respective elements described in this Description.

DESCRIPTION OF EMBODIMENTS

Preferable embodiments of the present invention are described below. Matters necessary to practice this invention other than those specifically referred to in this Description can be understood by a person skilled in the art based on the disclosure about implementing the invention in this Description and common technical knowledge at the time the application was filed. The present invention can be practiced based on the contents disclosed in this Description and common technical knowledge in the subject field.

In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

As used herein, the term "acrylic monomer" comprehensively refers to a monomer having at least one (meth) acryloyl group per molecule (or a "(meth)acryloyl group-containing monomer" hereinafter) and (meth)acrylonitrile. As used herein, the term "(meth)acryloyl" comprehensively refers to acryloyl and methacryloyl. Similarly, the terms "(meth)acrylate," "(meth)acryl" and "(meth)acrylonitrile" comprehensively refer to acrylate and methacrylate, acryloyl and methacryloyl, and acrylonitrile and methacrylonitrile, respectively.

<Paint-Protective Coating Material>

This Description provides a paint-protective coating material formed from a liquid coating composition comprising a polymer (A) as base polymer. Here, the term "base polymer" refers to a component accounting for more than 50% by weight (typically 70% by weight or more, e.g., 90% by weight or more, possibly 95% by weight or more, or even 100% by weight) of the polymer in the coating composition. The base polymer in a paint-protective coating material also means the same.

Figure 1:
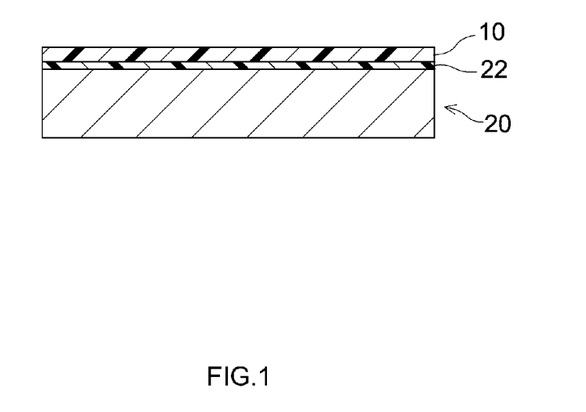
FIG. 1 shows a cross-sectional diagram schematically illustrating an example of the object protected with the paint-protective coating material according to this invention.

The coating material disclosed herein can be formed using a coating composition as those described above. For instance, the coating composition is applied (preferably slot-die coated) onto a paint layer of an object to be protected and allowed to dry. By this, for instance, as shown in FIG. 1, a paint-protective coating material 10 formed from the coating composition can be formed on a paint layer 22 of an object 20 to be protected.

The coating material disclosed herein has a storage modulus at 70° C. (G'(70)) of 0.40 MPa or higher and 1.30 MPa or lower. The coating material having a G'(70) of at least the prescribed value can be suitably removed from paint layers without excessive softening even at a temperature higher than room temperature, such as when the protected object provided with the coating material is placed outdoors in summer. From the standpoint of enhancing the removability at high temperatures, in some embodiments, G'(70) is advantageously 0.50 MPa or higher, preferably 0.60 MPa or higher, possibly 0.70 MPa or higher, 0.80 MPa or higher, or even 0.90 MPa or higher. The art disclosed herein can be implemented in an embodiment where G'(70) is 1.0 MPa or higher, 1.1 MPa or higher, or even 1.2 MPa or higher. It is also preferable that the coating material has a G'(70) of a prescribed value or lower in view of helping to prevent it from leaving marks on the paint layer. In some embodiments, G'(70) can be, for instance, 1.2 MPa or lower, 1.1 MPa or lower, or even 1.0 MPa or lower. The art disclosed herein can be implemented in an embodiment where G'(70) is 0.90 MPa or lower, or even 0.80 MPa or lower.

The coating material has a storage modulus at 23° C. (G'(23)) of 250 MPa or higher and 800 MPa or lower. In some embodiments, G'(23) can be 300 MPa or higher, 350 MPa or higher, 450 MPa or higher, or even 500 MPa or higher. The coating material having a G'(23) of at least the prescribed values tends to be less susceptible to tearing and excessive elongation while being peeled off the paint layer in a room temperature range. On the other hand, from the standpoint of reducing marking on paint layers, it is also advantageous that G'(23) is not excessively high. It is also preferable in view of removal workability because it facilitates the initial action to start removing the coating material from the paint layer (e.g., scratching an edge of the coating material with a fingernail, etc., for lifting from the paint layer). In some embodiments, G'(23) can be 750 MPa or lower, 700 MPa or lower, 600 MPa or lower, 500 MPa or lower, or even 400 MPa or lower.

The coating material has a storage modulus at −30° C. (G'(−30)) of 2300 MPa or lower. From the standpoint of helping to better prevent marking, G'(−30) is advantageously 2200 MPa or lower (e.g., below 2200 MPa), preferably 2000 MPa or lower, more preferably 1900 MPa or lower, possibly 1800 MPa or lower, 1700 MPa or lower, or even 1600 MPa or lower. The minimum G'(−30) is not particularly limited. In view of facilitating formation of the coating material having G'(70) and G'(23) in suitable ranges, in some embodiments, G'(−30) is suitably 500 MPa or higher, preferably 800 MPa or higher, more preferably 1000 MPa or higher, possibly 1200 MPa or higher, 1300 MPa or higher, or even 1400 MPa or higher.

The storage moduli (G'(70), G'(23), G'(−30)) of the coating material are determined according to the method described later in Examples.

In some embodiments of the coating material disclosed herein, determined as the tan δ peak temperature in viscoelastic analysis, the coating material has a glass transition temperature (or "RSA-Tg" hereinafter) of suitably 20° C. or higher, preferably 30° C. or higher, or more preferably 34° C. or higher. RSA-Tg can be, for instance, 50° C. or lower, 45° C. or lower, or even 43° C. or lower (e.g., 41° C. or lower). The coating material having an RSA-Tg value in these ranges is likely to have one, two or more among the aforementioned G'(70), G'(23) and G'(−30) in suitable ranges.

Determined as the temperature corresponding to the inflection point of loss modulus G" in viscoelastic analysis, the coating material according to some embodiments has a glass transition temperature (or "RSA-Tg(G")" hereinafter) of suitably 5° C. or higher, preferably 15° C. or higher, or more preferably 20° C. or higher. RSA-Tg(G") can be, for instance, 40° C. or lower, 35° C. or lower, or even 30° C. or lower (e.g., 25° C. or lower). The paint-protective coating material having an RSA-Tg(G") value in these ranges is likely to satisfy the aforementioned G'(23) and G'(70) values. Examples B1 to B9 described later had the following RSA-Tg(G") values: 20° C. (B1), 20° C. (B2), 20° C. (B3), 20° C. (B4), 23° C. (B5), 20° C. (B6), 23° C. (B7), 23° C. (B8) and 23° C. (B9).

Determined by the tensile test described later in Examples, the coating material disclosed herein has a breaking strength of suitably 12 N/25 mm or greater, advantageously 15 N/25 mm or greater, preferably 20 N/25 mm or greater, more preferably 25 N/25 mm or greater (e.g., 30 N/25 mm or greater), or possibly even 35 N/25 mm or greater.

Determined by the tensile test described later in Examples, the coating material disclosed herein has an elongation at break of suitably 100% or higher, advantageously 150% or higher, preferably 200% or higher, possibly 220% or higher, or even 250% or higher. Such coating material can suitably deform during removal from paint layers for stress distribution; and therefore, the coating material can be inhibited from breaking due to local stress concentration. The maximum elongation at break is not particularly limited. For instance, it is suitably 500% or lower, possibly 450% or lower, or even 400% or lower. Not having too high an elongation at break can be advantageous from the standpoint of increasing work efficiency during removal.

The coating material according to some embodiments of the art disclosed herein, in view of obtaining good removability from paint layers, the peel strength is suitably less than 4.0 N/25 mm of preferably 2.5 N/25 mm or less, determined by the following method:

[Peel Strength Measurement]

A painted steel plate is horizontally held with the painted face up, the steel plate coated with an acid epoxy crosslinked acrylic paint (product name KINO1210TW available from Kansai Paint Co., Ltd.). Onto the painted face (paint layer) of the painted steel plate, the coating composition is applied to a non-volatile thickness of 100 µm and allowed to dry at 80° C. for three minutes to form a film (a paint-protective coating material). Subsequently, the painted steel plate was placed into an incubator at 70° C. and stored for seven days. The painted steel plate is removed from the incubator and stored in an environment at 23° C. and 50% RH for at least 30 minutes. In the film on the paint layer, two linear cuts (25 mm apart) and a cut perpendicular to the cuts are made. The film is partially removed from the latter cut and set in a tensile tester. By peeling it at a tensile speed of 0.3 m/min in the 180° direction, the film's peel strength (N/25 mm) on the painted steel plate is determined. As the tensile tester, for instance, system name TENSILON available from Shimadzu Corporation or its equivalent can be used.

In some embodiments, the peel strength is more preferably 2.0 N/25 mm or less, yet more preferably 1.5 N/25 mm or less, possibly 1.2 N/25 mm or less, or even 1.0 N/25 mm or less. Having a low peel strength is preferable also in view of reducing removal workload and advantageous in view of reducing tearing and chipping of the coating material during removal. From the standpoint of obtaining suitably tight adhesion to paint layers, the peel strength is suitably 0.1 N/25 mm or greater, preferably 0.2 N/25 mm or greater, possibly 0.3 N/25 mm or greater, 0.5 N/25 mm or greater, or even 0.7 N/25 mm or greater. It is preferable that the peel strength is not excessively low in view of preventing the coating material from unintentionally peeling off from the paint layer while protecting the paint layer.

In some embodiments, the breaking strength (N/25 mm) is suitably at least 5 times the peel strength (N/25 mm), advantageously at least 8 times, and preferably at least 10 times. With increasing breaking strength/peel strength ratio, it tends to be less susceptible to tearing and chipping during removal from the paint layer being protected. From such a standpoint, the breaking strength/peel strength ratio can be 15 or higher, 20 or higher, 25 or higher, 30 or higher, 35 or higher, or even 40 or higher. The maximum breaking strength/peel strength ratio is not particularly limited. In view of helping to obtain both suitable peel strength and good non-marking properties, it is suitably 100 or lower, possibly 80 or lower, 70 or lower, or even 60 or lower.

<Polymer (A)>

The polymer (A) in the art disclosed herein is a polymerization product of monomers comprising an acrylic monomer. Thus, the polymer (A) includes a monomeric unit derived from the acrylic monomer.

The polymer (A) may have a calculated Tg (glass transition temperature calculated based on the composition of the monomers forming the polymer (A)) of, for instance, −60° C. or higher and 20° C. or lower. In some embodiments, in view of non-marking properties of the polymer-(A)-containing coating material or in view of helping to obtain a coating material having a suitably large elongation at break which is described later, the calculated Tg of the polymer (A) is suitably 15° C. or lower, advantageously 10° C. or lower (e.g., 5° C. or lower), preferably 0° C. or lower, more preferably −1.0° C. or lower, possibly −5.0° C. or lower, −8.0° C. or lower, or even −10.0° C. or lower. It is also advantageous that the polymer (A) has a low calculated Tg in view of improving the removal workability (e.g., reduction of failed removal due to chipping and tearing of the coating material) when removing the coating material from paint layers in a low-temperature environment such as outdoors in winter and also in view of reducing cracking in the coating material caused by a difference in linear expansion coefficient compared to the protected object, etc. On the other hand, in view of the removability and removal workability in a high temperature range, the polymer (A)'s calculated Tg is suitably −50° C. or higher (e.g., −40° C. or higher), advantageously −35° C. or higher, preferably −20° C. or higher, possibly −15° C. or higher, or even −13° C. or higher. The art disclosed herein can be preferably implemented in an embodiment using a polymer (A) that has a calculated Tg of, for instance, −20° C. or higher and 0° C. or lower. The polymer (A) having a calculated Tg in such a range helps obtain a paint-protective coating material that satisfies the storage moduli at the respective temperatures described above.

As used herein, the acrylic polymer's calculated Tg refers to the Tg value determined by the Fox equation based on the composition of the monomers used in synthesizing the polymer. As shown below, the Fox equation is a relational expression between the Tg of a copolymer and glass transition temperatures Tgi of homopolymers of the respective monomers constituting the copolymer.

$$1/Tg = \sum (Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

As the glass transition temperatures of homopolymers used for determining the calculated Tg value, values found in publicly known documents are used. For example, with respect to the monomers listed below, as the glass transition temperatures of homopolymers of the monomers, the following values are used:

| | |
|---|---|
| n-butyl acrylate | −55° C. |
| acrylonitrile | 97° C. |
| vinyl acetate | 32° C. |
| methyl methacrylate | 105° C. |
| acrylic acid | 106° C. |

With respect to the glass transition temperatures of homopolymers of monomers other than those listed above, values given in "*Polymer Handbook*" (3rd edition, John Wiley & Sons, Inc., Year 1989) are used. When no homopolymer Tg values are given in known documents, values obtained by the method according to Japanese Patent Application Publication No. 2007-51271 are used. In particular, to a reaction vessel equipped with a thermometer, a stirrer, a nitrogen inlet and a condenser, are added 100 parts by weight of monomer, 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature, and a homopolymer solution having 33% by mass solids content is obtained.

Then, this homopolymer solution is applied onto a release liner by flow coating and allowed to dry to prepare a test sample (a sheet of homopolymer) of about 2 mm thickness. This test sample is cut out into a disc of 7.9 mm diameter and is placed between parallel plates; and while applying a shear strain at a frequency of 1 Hz using a rheometer (model name ARES available from TA Instruments, Japan), the viscoelasticity is measured in the shear mode over a temperature range of −70° C. to 150° C. at a heating rate of 5° C./min; and the peak temperature of the tan δ curve is taken as the Tg of the homopolymer.

In some embodiments, the polymer (A) has an SP value of suitably higher than 9.5 (unit: $(cal/cm^3)^{1/2}$; the same applies hereinafter), advantageously 9.7 or higher (e.g., 9.8 or higher, or 9.9 or higher), or preferably 10.0 or higher. The polymer (A)'s such an SP value can be far from (typically far above) the SP value of the paint layer to be protected. For instance, the paint layer can be a urethane-based paint layer formed upon reaction between a polyol (e.g., acrylic polyol) and a polyisocyanate, a paint layer formed from an acid-epoxy crosslinked acrylic paint, or the like. With the polymer (A)'s SP value being far from the paint layer's SP value, the coating material comprising the polymer (A) tends to be less interactive with the paint layer. This serves as advantages such as reduction of failed removal caused by too high a coating material peel strength on the paint layer, reduction of removal workload, reduction of paint layer deformation (making) due to mass transfer between the paint layer and the coating material. In some embodiments, the polymer (A)'s SP value can be above 10.0, 10.5 or higher, 10.8 or higher, 11.2 or higher, or even 11.5 or higher. The maximum SP value of the polymer (A) is not particularly limited. In view of facilitating formation of a coating material with well-balanced properties, in some embodiments, the polymer (A)'s SP value is generally suitably 14.0 or lower, possibly 13.5 or lower, 13.0 or lower, below 12.5, 12.0 or lower, below 12.0, or even 11.5 or lower.

As used herein, the SP value refers to the solubility parameter value determined from the basic structure of the compound by the method proposed by Fedors. The polymer (A)'s SP value can be adjusted by selecting the composition of the monomers forming the polymer (A), in particular, by selecting the monomer species and their quantitative ratio in the monomer mixture.

In some embodiments, the SP value of the polymer (A) is suitably higher by 0.2 or more than the SP value of the paint layer to be protected, preferably higher by 0.5 or more, more preferably higher by 0.7 or more, or yet more preferably higher by 1.0 or more. With a combination of the polymer (A) and the paint layer subject to protection with such a difference in SP value, good removability and good non-marking properties are likely to be favorably obtained with the coating material comprising the polymer (A).

The polymer (A) in the art disclosed herein is a polymerization product of monomers (a monomer mixture) comprising one, two or more species of acrylic monomers. The acrylic monomer content in the monomers is, for instance, possibly 5% by mole (mol %) or higher, suitably 10 mol % or higher, preferably 15 mol % or higher, also possibly 25 mol % or higher, 35% mol % or higher, 45 mol % or higher, above 50 mol %, or even above 70 mol %. In some embodiments, the acrylic monomer content in the monomers can be 85 mol % or higher, 90 mol % or higher, 95 mol % or higher, or even 100 mol %. In some embodiments, the content of acrylic monomer in the monomers can be 50 mol % or lower, 40 mol % or lower, or even 30 mol % or lower.

In some embodiments, the polymer-(A)-forming monomers comprise at least a (meth)acryloyl group-containing monomer. As the (meth)acryloyl group-containing monomer, solely one species or a combination of two or more species can be used. The (meth)acryloyl group-containing monomer content in the monomers is, for instance, possibly 5 mol % or higher, suitably 10 mol % or higher, preferably 15 mol % or higher, more preferably 20 mol % or higher, also possibly 30 mol % or higher, 40 mol % or higher, 45 mol % or higher, 50 mol % or higher, 55 mol % or higher, or even 60 mol % or higher. The (meth)acryloyl group-containing monomer may account for all (i.e., 100 mol %) of the monomers. In view of helping to combine it with up to the prescribed calculated Tg and facilitating formation of a coating material with well-balanced properties, in some embodiments, the (meth)acryloyl group-containing monomer content in the monomers is preferably 95 mol % or lower, more preferably 90 mol % or lower, possibly 85 mol % or lower, 80 mol % or lower, 75 mol % or lower, or even 70 mol % or lower. The art disclosed herein can also be implemented in an embodiment where the (meth)acryloyl group-containing monomer content in the monomers is 65 mol % or lower, 55 mol % or lower, 45 mol % or lower, or even 35 mol % or lower.

The monomer mixture forming the polymer (A) preferably comprises at least an alkyl (meth)acrylate as the (meth)acryloyl group-containing monomer. By selecting a species and an amount used, the alkyl (meth)acrylate may help adjust the storage modulus, tensile properties, the SP value described later, etc. For the alkyl (meth)acrylate, solely one species or a combination of two or more species can be used.

As the alkyl (meth)acrylate, for instance, a compound represented by the following formula (1) can be preferably used:

$$CH_2 = C(R^1)COOR^2 \quad (1)$$

Here, $R^1$ in the formula (1) is a hydrogen atom or a methyl group. $R^2$ in the formula (1) is an acyclic alkyl group having 1 to 20 carbon atoms. Hereinafter, such a range of the number of carbon atoms may be indicated as "$C_{1-20}$." The acyclic alkyl group can be linear or branched.

Specific examples of the $C_{1-20}$ alkyl (meth)acrylate (alkyl (meth)acrylate wherein $R^2$ is a $C_{1-20}$ acyclic alkyl group) are not particularly limited. Examples include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate.

Among these, it is preferable to use at least a $C_{4-20}$ alkyl (meth)acrylate (preferably a $C_{4-14}$ alkyl (meth)acrylate). It is more preferable to use a $C_{4-9}$ alkyl (meth)acrylate as it may contribute to a decrease in the polymer (A)'s calculated Tg. For instance, the monomers preferably include one or both of n-butyl acrylate (BA) and 2-ethylhexyl acrylate (2EHA), and more preferably include at least BA.

Of the polymer-(A)-forming monomers, the $C_{1-20}$ alkyl (meth)acrylate content is, for instance, possibly 5 mol % or higher, suitably 10 mol % or higher, preferably 15 mol % or higher, also possibly 25 mol % or higher, 35 mol % or higher, 45 mol % or higher, 55 mol % or higher, or even 60 mol % or higher. In view of helping to obtain a polymer (A) that satisfies the prescribed or lower SP value and the prescribed or lower calculated Tg, the $C_{1-20}$ alkyl (meth)acrylate content in the monomers is suitably 95 mol % or lower, preferably 90 mol % or lower, possibly 85 mol % or lower, 80 mol % or lower, 75 mol % or lower, 70 mol % or lower, or even 65 mol % or lower. The art disclosed herein can also be implemented in an embodiment where the $C_{1-20}$ alkyl (meth)acrylate content in the monomers is 60 mol % or lower, 50 mol % or lower, 40 mol % or lower, or 30 mol % or lower.

In an embodiment where the polymer-(A)-forming monomers include a $C_{4-9}$ alkyl acrylate, the $C_{4-9}$ alkyl acrylate content in the monomers is, for instance, possibly 5 mol % or higher, or suitably 10 mol % or higher. In view of helping to obtain a lower calculated Tg, it is preferably 15 mol % or higher, 25 mol % or higher, 35 mol % or higher, 40 mol % or higher, or even 45 mol % or higher. On the other hand, in view of helping to obtain a polymer (A) having at least the prescribed SP value, the $C_{4-9}$ alkyl acrylate content in the monomers is suitably 80 mol % or lower, preferably 70 mol % or lower, possibly 65 mol % or lower, 60 mol % or lower, or even 55 mol % or lower. The art disclosed herein can also be implemented in an embodiment where the $C_{4-9}$ alkyl acrylate content in the monomers is 50 mol % or lower, 40 mol % or lower, 30 mol % or lower, 25 mol % or lower, or even 20 mol % or lower.

The polymer-(A)-forming monomers may include an alkyl (meth)acrylate and a non-alkyl-(meth)acrylate monomer (a monomer that is not an alkyl (meth)acrylate) together. Examples of the non-alkyl-(meth)acrylate monomer include functional group-containing monomers such as carboxy group-containing monomers, hydroxy (OH) group-containing monomers, cyano group-containing monomers, amide group-containing monomers, amino group-containing monomers, monomers having nitrogen atom-containing rings (N-containing rings), acid anhydride group-containing monomers, epoxy group-containing monomers, keto group-containing monomers, and alkoxysilyl group-containing monomers. Proper use of functional group-containing monomers can increase the cohesive strength of polymer (A). The functional group-containing monomers may also help adjust the storage modulus, tensile properties, the SP value described later, etc.

Examples of carboxy group-containing monomers include acrylic acid (AA), methacrylic acid (MAA), carboxyethyl (meth)acrylate, carboxypentyl (meth)acrylate, itaconic acid, maleic acid, fumaric acid, crotonic acid and isocrotonic acid. Among them, AA and MAA are preferable.

Examples of hydroxy group-containing monomers include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate; and polypropylene glycol mono(meth)acrylate. Particularly preferable hydroxy group-containing monomers include hydroxyalkyl (meth)acrylates having linear alkyl groups with two to four carbon atoms.

Examples of cyano group-containing monomers include acrylonitrile, methacrylonitrile and 2-cyanoethyl (meth)

acrylate. Among them, acrylonitrile and methacrylonitrile are preferable. Acrylonitrile is especially preferable.

Examples of amide group-containing monomers include (meth)acrylamide, N,N-dimethyl (meth)acrylamide, N-butyl (meth)acrylamide, N-methylol (meth)acrylamide, N-hydroxyethyl (meth)acrylamide, N-methoxymethyl (meth)acrylamide, N-butoxymethyl (meth)acrylamide, and diacetone (meth)acrylamide.

Examples of amino group-containing monomers include aminoethyl (meth)acrylate, N,N-dimethylaminoethyl (meth)acrylate and t-butylaminoethyl (meth)acrylate.

Examples of monomers having N-containing rings include a monomer having a structure in which a substituent having a polymerizable functional group is bonded to a N-containing ring such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam and N-(meth)acryloyl morpholine. Other examples include maleimide ring-containing monomers such as N-isopropylmaleimide and N-cyclohexylmaleimide.

Examples of isocyanate group-containing monomers include 2-(meth)acryloyloxyethylisocyanate.

Examples of acid anhydride group-containing monomers include maleic acid anhydride and itaconic acid anhydride.

Examples of keto group-containing monomers include diacetone (meth)acrylate, vinyl methyl ketone, vinyl ethyl ketone, allyl acetoacetate and vinyl acetoacetate.

Examples of epoxy group-containing monomers include glycidyl (meth)acrylate, methylglycidyl (meth)acrylate and allyl glycidyl ether.

Examples of alkoxysilyl group-containing monomers include (3-(meth)acryloxypropyl)trimethoxysilane, (3-(meth)acryloxypropyl)triethoxysilane, (3-(meth)acryloxypropyl)methyldimethoxysilane and (3-(meth)acryloxypropyl)methyldiethoxysilane.

For an increase in cohesive strength and like purpose, the polymer-(A)-forming monomers may include other comonomers besides the monomers described above. Examples of the other comonomers include vinyl ester-based monomers such as vinyl acetate (VAc), vinyl propionate and vinyl laurate; aromatic vinyl compounds such as styrene, substituted styrenes (α-methylstyrene, etc.) and vinyltoluene; cycloalkyl (meth)acrylates such as cyclohexyl (meth)acrylate, cyclopentyl (meth)acrylate and isobornyl (meth)acrylate; aromatic ring-containing (meth)acrylates such as aryl (meth)acrylates (e.g., phenyl (meth)acrylate), aryloxyalkyl (meth)acrylate (e.g., phenoxyethyl (meth)acrylate) and arylalkyl (meth)acrylate (e.g., benzyl (meth)acrylate); olefinic monomers such as ethylene, propylene, isoprene, butadiene and isobutylene; chlorine-containing monomers such as vinyl chloride and vinylidene chloride; alkoxy group-containing monomers such as methoxyethyl (meth)acrylate, ethoxyethyl (meth)acrylate and ethyl carbitol (meth)acrylate; vinyl ether-based monomers such as methyl vinyl ether and ethyl vinyl ether; and a polyfunctional monomer having two or more (e.g., three or more) polymerizable functional groups (e.g. (meth)acryloyl groups) per molecule, such as 1,6-hexanediol di(meth)acrylate and trimethylolpropane tri(meth)acrylate.

In some embodiments, the polymer-(A)-forming monomers include a N-containing monomer. Examples of the N-containing monomer include monomers corresponding to at least one of the aforementioned cyano group-containing monomer, amide group-containing monomer, amino group-containing monomer, monomer having a N-containing ring, etc. As the N-containing monomer, solely one species or a combination of two or more species can be used. The monomers include a N-containing monomer preferably in combination with an alkyl (meth)acrylate and more preferably with a $C_{4-9}$ alkyl acrylate. With the N-containing structural moieties, N-containing monomers tend to show relatively high SP values (e.g., higher than those of alkyl (meth)acrylates). By suitably using the N-containing monomer, the resulting polymer (A) is likely to have at least the prescribed SP value. While N-containing monomers tend to have high homopolymer Tg values, the suitably combined use of the N-containing monomer and $C_{4-9}$ alkyl acrylate can favorably bring about a polymer (A) that achieves both at least the prescribed SP value and a Tg up to the prescribed value.

In an embodiment where the polymer-(A)-forming monomers include a N-containing monomer, the N-containing monomer content in the monomers can be set to obtain the desirable effect of use. In some embodiments, the N-containing monomer content in the monomers is, for instance, possibly 1 mol % or higher, suitably 5 mol % or higher, preferably 10 mol % or higher, more preferably 15 mol % or higher, possibly 20 mol % or higher, 25 mol % or higher, 30 mol % or higher, or even 35 mol % or higher. On the other hand, in view of readily allowing the polymer (A)'s calculated Tg to be at or below the prescribed value, the N-containing monomer content in the monomers is suitably 70 mol % or lower, preferably 65 mol % or lower, possibly 60 mol % or lower, 55 mol % or lower, 50 mol % or lower, 45 mol % or lower, or even 40 mol % or lower.

In some preferable embodiments, the polymer-(A)-forming monomers include at least acrylonitrile as the N-containing monomer. The inclusion of acrylonitrile in the monomers helps bring about a coating material that combines well-balanced removability and good non-marking properties as well as a coating composition capable of forming the coating material. The content of acrylonitrile in the N-containing monomers included in the monomers can be, for instance, 25 mol % or higher, 50 mol % or higher, 70 mol % or higher, 85 mol % or higher, 95 mol % or higher, or even 100 mol %.

In an embodiment where the polymer-(A)-forming monomers include acrylonitrile, the content of acrylonitrile in the monomers is, for instance, possibly 1 mol % or higher, suitably 5 mol % or higher, preferably 10 mol % or higher, more preferably 15 mol % or higher, also possibly 20 mol % or higher, 25 mol % or higher, 30 mol % or higher, or even 35 mol % or higher. On the other hand, in view of readily keeping the polymer (A)'s calculated Tg at or below a certain value, the content of acrylonitrile in the monomers is suitably 70 mol % or lower, preferably 65 mol % or lower, possibly 60 mol % or lower, 55 mol % or lower, 50 mol % or lower, 45 mol % or lower, or even 40 mol % or lower.

The acid value of polymer (A) is not particularly limited and can be, for instance, 60 mgKOH/g or less. In some embodiments, in view of reducing the peel strength on paint layers, the polymer (A)'s acid value is advantageously 20.0 mgKOH/g or less, preferably 15.0 mgKOH/g or less, more preferably 12.0 mgKOH/g or less, possibly 11.0 mgKOH/g or less, or even 10.0 mgKOH/g or less. The art disclosed herein can also be implemented in an embodiment in which the polymer (A) has an acid value of 8.0 mgKOH/g or less, 6.0 mgKOH/g or less, 3.0 mgKOH/g or less, or 1.0 mgKOH/g or less. The polymer (A)'s acid value can also be at or above 0 mgKOH/g. In some embodiments, in view of increasing the coating material strength (e.g., breaking strength), etc., the polymer (A) may have an acid value of, for instance, 1.0 mgKOH/g or greater, 2.0 mgKOH/g or greater, 4.0 mgKOH/g or greater, or even 7.0 mgKOH/g or greater. It can be advantageous to increase the coating material strength from the standpoint of increasing removal workability (e.g., preventing tearing and chipping during removal).

The acid value of polymer (A) is determined by the potentiometric titration method specified in JIS K0070: 1992. In particular, the acid value can be measured by the method described later in Examples. As for the sample for acid value measurement, with respect to the polymer (A) in the coating material, the coating material is placed in chloroform; the resulting mixture is left still for 12 hours and then filtered through a filter; and a substance having a weight average molecular weight of $1 \times 10^4$ or higher (determined by GPC) is used as the sample. For measuring the acid value of the polymer (A) in the coating composition, the coating composition is allowed to dry at 80° C. for 3 minutes to form a film (coating material) of about 100 μm in thickness, the same procedure as the acid value measurement sample for the polymer (A) in the coating material is then carried out, and the resulting substance is used as the sample. The acid value of the polymer (A) in the aqueous polymer (A) emulsion described later is measured, using as the sample, a substance obtained in the same manner as the acid value measurement sample for the polymer (A) in the coating composition.

In some embodiments of the art disclosed herein, the polymer-(A)-forming monomers include a monomer ($m_T$) having a homopolymer Tg of 90° C. or higher and a monomer ($m_L$) having a homopolymer Tg of −30° C. or lower. Here, the monomer ($m_T$) may include a N-containing monomer having a homopolymer Tg of 90° C. or higher. One example of the N-containing monomer whose homopolymer Tg is 90° C. or higher is acrylonitrile (homopolymer Tg: 97° C.). Accordingly, the polymer (A) in such an embodiment can be a polymerization product of monomers that comprise a monomer ($m_L$) and a monomer ($m_T$) comprising at least a N-containing monomer (e.g., acrylonitrile) and may further comprise other monomers. As for the homopolymer Tg values of the respective monomers, similar to the homopolymer glass transition temperatures used for determining the calculated Tg described above, values given in known documents are used. When no homopolymer Tg values are given in known documents, values obtained by the method according to Japanese Patent Application Publication No. 2007-51271 are used.

The monomer ($m_L$) may lower the polymer (A)'s calculated Tg and help enhance the non-marking properties of the coating material comprising the polymer (A). It can be advantageous to lower the polymer (A)'s calculated Tg also in view of enhancing the low-temperature properties (e.g., cracking resistance at low temperatures, breaking/tearing resistance during removal from paint layers at low temperatures, etc.) of the coating material. As the monomer ($m_L$), a species having a homopolymer Tg of −30° C. or lower can be used. It can be selected among, but not limited to, for instance, the aforementioned various monomers. For the monomer ($m_L$), solely one species or a combination of two or more species can be used. Non-limiting specific examples of monomers usable as the monomer ($m_L$) include n-butyl acrylate (BA), 2-ethylhexyl acrylate (2EHA), isooctyl acrylate, isononyl acrylate, isoamyl acrylate, 4-hydroxybutyl acrylate (4HBA), methoxyethyl acrylate, ethyl carbitol acrylate and ethoxy diethyleneglycol acrylate.

The minimum homopolymer Tg of each monomer used as the monomer ($m_L$) is not particularly limited. It can be, for instance, −100° C. or higher, −90° C. or higher, or −80° C. or higher. In some embodiments, as the monomer ($m_L$), a monomer having a homopolymer Tg in the range of −60° C. or higher and −40° C. or lower can be preferably used. Of the monomer ($m_L$), the content of monomer whose homopolymer Tg is in the range of −60° C. or higher and −40° C. or lower can be, for instance, 50 mol % or higher, 75 mol % or higher, 85 mol % or higher, 95 mol % or higher, or even 100 mol %.

The monomer ($m_T$) may help enhance the coating material's cohesive strength and high-temperature properties (e.g., less lowering of storage modulus in a high temperature range, removability at high temperatures, etc.). As the monomer ($m_T$), solely as one species or in a combination of two or more species. The monomer ($m_T$) may include solely one species of N-containing monomer; a combination of two or more species of N-containing monomer; or one, two or more species of N-containing monomer in combination with other monomer(s) (i.e., monomer(s) that are not N-containing monomers, or "N-free monomer(s)" hereinafter) having a homopolymer Tg of 90° C. or higher. As the monomer ($m_T$), it is possible to use acrylonitrile alone, acrylonitrile in combination with a N-free monomer having a homopolymer Tg of 90° C. or higher, or acrylonitrile in combination with a N-free monomer having a homopolymer Tg of 90° C. or higher and a N-containing monomer (other than acrylonitrile). For the N-free monomer having a homopolymer Tg of 90° C. or higher, the corresponding species can be suitably selected among, for instance, the aforementioned various monomers while not limited to these. Among the N-free monomers, solely one species or a combination of two or more species can be used along with a N-containing monomer (e.g., acrylonitrile) having a homopolymer Tg of 90° C. or higher. The maximum homopolymer Tg of each monomer used as the monomer ($m_T$) is not particularly limited. For instance, it can be 250° C. or lower, 200° C. or lower, or even 150° C. or lower.

Non-limiting specific examples of the N-free monomer possibly used as the monomer ($m_T$) include acrylic acid, methacrylic acid, methyl methacrylate, methacrylonitrile, acryloylmorpholine, acrylamide, isobornyl acrylate, isobornyl methacrylate, dicyclopentanyl acrylate, dicyclopentanyl methacrylate, adamantyl acrylate and tert-butyl methacrylate. Favorable examples include acrylic acid (AA) and methyl methacrylate (MMA).

The N-containing monomer content in the monomer ($m_T$) can be 35 mol % or higher. From the standpoint of helping to obtain favorable film properties, it is suitably 50 mol % or higher, or preferably 60 mol % or higher. In some embodiments, the N-containing monomer content in the monomer ($m_T$) can be above 70 mol %, above 80 mol %, above 90 mol %, above 93 mol %, or even 100 mol %. In some embodiments, the N-containing monomer content in the monomer ($m_T$) can be 85 mol % or lower, 75 mol % or lower, 70 mol % or lower, or even 65 mol % or lower.

In some embodiments, the N-containing monomer in the monomer ($m_T$) includes at least acrylonitrile. In such an embodiment, the acrylonitrile content of the N-containing monomer in the monomer ($m_T$) can be, for instance, 25 mol % or higher, 50 mol % or higher, 70 mol % or higher, 85 mol % or higher, 95 mol % or higher, or even 100 mol %.

In an embodiment where the monomer ($m_T$) includes acrylonitrile, the acrylonitrile content of the monomer ($m_T$) can be, for instance, 35 mol % or higher. From the standpoint of helping to obtain favorable film properties, it is suitably 50 mol % or higher, or preferably 60 mol % or higher. In some embodiments, the acrylonitrile content of monomer ($m_T$) can be above 70 mol %, above 80 mol %, above 90 mol %, above 93 mol %, or even 100 mol %. In some embodiments, the acrylonitrile content of monomer ($m_T$) can be 85 mol % or lower, 75 mol % or lower, 70 mol % or lower, or even 65 mol % or lower.

In an embodiment where the polymer-(A)-forming monomers include a monomer ($m_T$) and a monomer ($m_L$), the content of the N-containing monomer having a homopolymer Tg of 90° C. or higher in all the monomers can be, for instance, 20 mol % or higher. From the standpoint of helping to obtain favorable film properties, it is suitably 25 mol % or higher (e.g., 28 mol % or higher), preferably 30 mol % or higher, possibly 35 mol % or higher, or even 40 mol % or higher. The art disclosed herein can be preferably implemented in an embodiment where the N-containing monomer having a homopolymer Tg of 90° C. or higher accounts for more than 50 mol % or more of all the polymer-(A)-forming monomers. From the standpoint of the flexibility of the coating material, of all the monomers, the content of the N-containing monomer having a homopolymer Tg of 90° C. or higher is suitably 60 mol % or lower, or preferably below 60 mol %. In some embodiments, the content of the N-containing monomer having a homopolymer Tg of 90° C. or higher can be 57 mol % or lower, or even 56 mol % or lower. The art disclosed herein can also be implemented in an embodiment where the content of the N-containing monomer having a homopolymer Tg of 90° C. or higher is 53 mol % or lower, 50 mol % or lower, or even 40 mol % or lower.

In an embodiment where the polymer-(A)-forming monomers include a monomer ($m_T$) and a monomer ($m_L$), the acrylonitrile content of all the acrylic polymer-forming monomers can be, for instance, 20 mol % or higher. From the standpoint of helping to obtain favorable film properties, it is suitably 25 mol % or higher (e.g., 28 mol % or higher), preferably 30 mol % or higher, possibly 35 mol % or higher, or even 40 mol % or higher. The art disclosed herein can be preferably implemented in an embodiment where the acrylonitrile content of all the polymer-(A)-forming monomers is above 50 mol %. From the standpoint of the flexibility of the coating material, the acrylonitrile content is suitably 60 mol % or lower, or preferably below 60 mol %. In some embodiments, the acrylonitrile content can be 57 mol % or lower, or even 56 mol % or lower. The art disclosed herein can also be implemented in an embodiment where the acrylonitrile content is 53 mol % or lower, 50 mol % or lower, or even 40 mol % or lower.

In the monomers, the molar ratio ($m_T/m_L$) between the monomer ($m_T$) and the monomer ($m_L$) is not particularly limited. For instance, it can be about 0.05 to 3.00, or about 0.10 to 2.00. In some embodiments, the ratio $m_T/m_L$ can be, for instance, 0.60 or higher and 1.50 or lower, or 0.8 or higher and 1.5 or lower. With the polymer (A) formed from monomers having such a composition, the resulting coating material is likely to have storage moduli at the respective temperatures in the aforementioned ranges. In some embodiments, the ratio $m_T/m_L$ is preferably below 1.5, more preferably 1.4 or lower, possibly 1.35 or lower, 1.30 or lower, or even 1.25 or lower. In some embodiments, the ratio $m_T/m_L$ is preferably 0.70 or higher, more preferably 0.75 or higher, possibly 0.90 or higher, 1.0 or higher, or even above 1.0. This can bring about a coating material that combines good removability from paint layers and good removal workability at a higher level with good balance. The ratio $m_T/m_L$ can also be 1.1 or higher, 1.15 or higher, or even 1.20 or higher.

The polymer-(A)-forming monomers may further include other monomer(s) besides the monomers ($m_T$) and ($m_L$), that is, a monomer having a homopolymer glass transition temperature of higher than −30° C. and lower than 90° C. (or a monomer ($m_1$) hereinafter).

As the monomer ($m_1$), a species having a homopolymer glass transition temperature in the range can be selected among for instance, the aforementioned various monomers while it is not limited to these. For the monomer ($m_1$), solely one species or a combination of two or more species can be used. Non-limiting specific examples of monomers usable as the monomer ($m_1$) include ethyl acrylate (EA), ethyl methacrylate, methyl acrylate (MA), n-butyl methacrylate, isobutyl methacrylate, 2-hydroxyethyl acrylate, 2-hydroxyethyl methacrylate, 2-hydroxypropyl acrylate, 2-hydroxypropyl methacrylate, cyclohexyl acrylate, cyclohexyl methacrylate, vinyl acetate and N-vinyl-2-pyrrolidone.

The amount of monomer ($m_1$) can be suitably selected in the range up to the amount (mol %) obtained by subtracting the amounts (mol %) of monomers ($m_T$) and ($m_L$) from the amount of all monomers (100 mol %). In some embodiments, of all the monomers, the amount of monomer ($m_1$) is suitably no more than 80 mol % (e.g., no more than 40 mol %), advantageously no more than 30 mol %, preferably no more than 20 mol %, or more preferably no more than 15 mol %. The art disclosed herein can be preferably practiced in an embodiment where the amount of monomer (m) used is 0 mol % or greater and below 10 mol % of all monomers, for instance, 0 mol % or greater and below 5 mol %. Here, that the amount of monomer ($m_1$) used is 0 mol % of all monomers means that no monomer ($m_1$) is used at least intentionally.

<Synthesis of Polymer (A)>

The method for obtaining a polymer (A) from monomers as those described above is not particularly limited. Known polymerization methods can be suitably employed, such as emulsion polymerization, solution polymerization, bulk polymerization, and suspension polymerization. It is also possible to employ photopolymerization involving irradiation of light such as UV (typically carried out in the presence of a photopolymerization initiator) and active energy ray irradiation polymerization such as radiation polymerization involving irradiation of radioactive rays such as β rays and γ rays. In some preferable embodiments, the polymer (A) is obtained by emulsion polymerization of monomers having an aforementioned composition. As the monomer supply method in emulsion polymerization, a suitable method can be employed among the all-at-once method where all the starting monomer mixture is supplied in one portion, gradual supply method, portion-wise supply method, etc. An emulsion of some or all of the monomers pre-mixed with water and emulsifier can be supplied to the polymerization vessel.

The polymerization temperature can be suitably selected in accordance with the monomer species, the solvent species, and the polymerization initiator species used, etc. The polymerization temperature is suitably about 20° C. or higher, preferably about 40° C. or higher, more preferably about 50° C. or higher; it can also be about 60° C. or higher, about 65° C. or higher, or even about 70° C. or higher. The polymerization temperature is suitably about 170° C. or lower (typically about 140° C. or lower), or preferably about 95° C. or lower (e.g. about 85° C. or lower). In emulsion polymerization, the polymerization temperature is preferably about 95° C. or lower (e.g. about 85° C. or lower).

The solvent (polymerization solvent) used for solution polymerization can be suitably selected among heretofore known organic solvents. For instance, aromatic compounds (typically aromatic hydrocarbons) such as toluene, acetic acid esters such as ethyl acetates, aliphatic and alicyclic hydrocarbons such as hexane and cyclohexane are preferably used.

In the polymerization, a known or commonly used thermal polymerization initiator or photopolymerization initiator can be used in accordance with the polymerization method and polymerization conditions. For the polymerization initiator, solely one species or a combination of two or more species can be used.

While no particular limitations are imposed, as the thermal polymerization initiator, it is possible to use, for example, an azo-based initiator, peroxide-based initiator or redox-based initiator by the combination of a peroxide and a reducing agent.

Examples of azo-based initiators include 2,2'-azobisisobutyronitrile, 2,2'-azobis[N-(2-carboxyethyl)-2-methylpropionamidine] hydrate, 2,2'-azobis(2-methylpropionamidine) disulfate salt, 2,2'-azobis(2-methylpropionamidine) dihydrochloride, 2,2'-azobis(2-methylpropionamidine) dihydrochloride, 2,2'-azobis[2-(5-methyl-2-imidazolin-2-yl) propane] dihydrochloride and 2,2'-azobis(N,N'-dimethylene isobutylamidine) dihydrochloride.

Examples of peroxide-based initiators include persulfates such as potassium persulfate and ammonium persulfate; benzoyl peroxide, t-butyl hydroperoxide, di-t-butyl peroxide, dicumyl peroxide, dilauroyl peroxide, di-n-octanoyl peroxide, di(4-methylbenzoyl) peroxide, t-butyl peroxybenzoate, t-butyl peroxyisobutyrate, t-hexyl peroxypivalate, t-butyl peroxypivalate, di(2-ethylhexyl) peroxydicarbonate, di(4-t-butylcyclohexyl) peroxydicarbonate, di-sec-butyl peroxydicarbonate, t-butyl peroxyneodecanoate, 1,1,3,3-tetramethylbutylperoxy-2-ethylhexanoate, 1,1-bis(t-butylperoxy)-3,3,5-trimethylcyclohexane, 1,1-bis(t-butylperoxy) cyclododecane, 1,1-bis(t-hexylperoxy)cyclohexane and hydrogen peroxide.

Examples of redox-based initiators include a combination of a peroxide and ascorbic acid (combination of hydrogen peroxide water and ascorbic acid, etc.), a combination of a peroxide and an iron(II) salt (combination of hydrogen peroxide water and an iron(II) salt, etc.), and a combination of a persulfate salt and sodium hydrogen sulfite.

The photopolymerization initiator is not particularly limited. It is possible to use, for instance, ketal-based photopolymerization initiators, acetophenone-based photopolymerization initiators, benzoin ether-based photopolymerization initiators, acylphosphine oxide-based photopolymerization initiators, α-ketol photopolymerization initiators, aromatic sulphonyl chloride-based photopolymerization initiators, photoactive oxime-based photopolymerization initiators, benzoin-based photopolymerization initiators, benzylic photopolymerization initiators, benzophenone-based photopolymerization initiators, and thioxanthone-based photopolymerization initiators.

The polymerization initiator can be used in a usual amount in accordance with the polymerization method, embodiment of polymerization, etc., and there are no particular limitations to the amount. For instance, relative to 100 parts by weight of monomers to be polymerized, about 0.001 part to 5 parts by weight (typically about 0.01 part to 2 parts by weight, e.g. about 0.01 part to 1 part by weight) of polymerization initiator can be used.

For the polymerization, as necessary, various heretofore known chain transfer agents (which can be considered also as a molecular weight-adjusting agent or polymerization degree-adjusting agent) can be used. For the chain transfer agent, solely one species or a combination of two or more species can be used. As the chain transfer agent, mercaptans can be used, such as n-dodecyl mercaptan, t-dodecyl mercaptan and thioglycolic acid. Alternatively, a chain transfer agent free of sulfur atoms (a sulfur-free chain transfer agent) can be used as well. Specific examples of the sulfur-free chain transfer agent include anilines such as N,N-dimethylaniline and N,N-diethylaniline; terpenoids such as α-pinene and terpinolene; styrenes such as α-methylstyrene and α-methylstyrene dimer; compounds having benzylidenyl groups such as dibenzylidene acetone, cinnamyl alcohol and cinnamyl aldehyde; hydroquinones such as hydroquinone and naphthohydroquinone; quinones such as benzoquinone and naphthoquinone; olefins such as 2,3-dimethyl-2-butene and 1,5-cyclooctadiene; alcohols such as phenol, benzyl alcohol and allyl alcohol; and benzyl hydrogens such as diphenylbenzene and triphenylbenzene.

When using a chain transfer agent, it can be used in an amount of, for instance, about 0.01 part to 1 part by weight to 100 parts by weight of the monomers. The art disclosed herein can also be preferably implemented in an embodiment that uses no chain transfer agent.

Emulsion polymerization is usually carried out in the presence of an emulsifier. The emulsifier used in the emulsion polymerization is not particularly limited; known anionic emulsifiers, nonionic emulsifiers and the like can be used. These emulsifiers can be used singly as one species or in a combination of two or more species.

Non-limiting examples of anionic emulsifiers include sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates. Non-limiting examples of non-ionic emulsifiers include polyoxyethylene alkyl ethers, polyoxyethylene alkyl phenyl ethers, polyoxyethylene aliphatic acid esters, and polyoxyethylene-polyoxypropylene block polymers. Reactive functional group-containing emulsifiers (reactive emulsifiers) can be used as well. Examples of reactive emulsifiers include a radically polymerizable emulsifier having a structure of an aforementioned anionic emulsifier or nonionic emulsifier with a radically polymerizable group such as propenyl group and ally ether group introduced therein.

In the emulsion polymerization, the emulsifier can be used in an amount of, for instance, 0.2 part by weight or greater, 0.5 part by weight or greater, or 1.0 part by weight or greater, or even 1.5 parts by weight or greater, relative to 100 parts by weight of the monomers. From the standpoint of inhibiting foaming during emulsion polymerization and in a composition comprising the resulting emulsion, in some embodiments, the amount of emulsifier used is usually suitably 10 parts by weight or less to 100 parts by weight of the monomers, preferably 5 parts by weight or less, or possibly even 3 parts by weight or less.

Emulsion polymerization can also be carried out in the presence of a protective colloid. Examples of the protective colloid include polyvinyl alcohol-based polymers such as a partially-saponified polyvinyl alcohol, fully-saponified polyvinyl alcohol and modified polyvinyl alcohol; cellulose derivatives such as hydroxyethyl cellulose, hydroxypropyl cellulose and carboxymethyl cellulose; and natural polysaccharides such as guar gum. The partially saponified polyvinyl alcohol has a saponification degree typically below 95 mol %, possibly below 92 mol %, or even below 90 mol %. The minimum saponification degree of the partially saponified polyvinyl alcohol is not particularly limited. From the standpoint of the emulsion stability, etc., it is suitably 65 mol % or higher, preferably 70 mol % or higher, or more preferably 80 mol % or higher (e.g., 85 mol % or higher). Examples of the modified polyvinyl alcohol include an anionic modified polyvinyl alcohol having an anionic group such as a carboxy group and a sulfonate group; and a cationic modified polyvinyl alcohol having a cationic group such as a quaternary ammonium salt. For instance, the modified polyvinyl alcohol has a saponification degree below 98 mol %, possibly below 95 mol %, below 92 mol %, or even below 90 mol %. The minimum saponification degree of the modified polyvinyl alcohol can be, for instance, 55 mol % or higher. From the standpoint of the emulsion stability, etc., it is suitably 65 mol % or higher, preferably 70 mol % or higher, or more preferably 80 mol % or higher (e.g., 85 mol % or higher). For the protective colloid, solely one species or a combination of two or more species can be used.

The amount of protective colloid used to 100 parts by weight of monomers is suitably about 0.1 part by weight or greater, preferably 0.5 part by weight or greater (e.g., 0.7 part by weight or greater) and suitably 10 parts by weight or less, or preferably 5 parts by weight or less (e.g., 3 parts by weight or less, or 2 parts by weight or less). The use of the protective colloid is preferably combined with an aforementioned emulsifier, but not limited to this. The protective colloid can be used without using an emulsifier. For instance, emulsion polymerization can be carried out in the following embodiment: water and a protective colloid are placed into a polymerization vessel; monomers are partially or entirely pre-mixed and emulsified with water and an emulsifier; and the resulting emulsion is supplied to the polymerization vessel. When using an anionic protective colloid (e.g., anionic polyvinyl alcohol) and an emulsifier together, from the standpoint of the polymerization stability and like, as the emulsifier, it is preferable to use one, two or more species selected from the group of anionic emulsifiers and nonionic emulsifiers.

In some preferable embodiments, emulsion polymerization is carried out in the presence of a polyvinyl alcohol-based polymer. Aqueous polymer (A) emulsions obtained by such emulsion polymerization tend to bring about thickening effect upon addition of thickeners. With the use of such a polymer (A) emulsion, a coating composition can be favorably prepared, showing good viscometric properties suited for slot-die coating. Favorable examples of the polyvinyl alcohol-based polymer include an anionic modified polyvinyl alcohol. For instance, a sulfonated polyvinyl alcohol and/or a carboxylated polyvinyl alcohol can be preferably used. A polyvinyl alcohol-based polymer can be used in combination with an emulsifier.

<Coating Composition>

The coating composition disclosed herein comprises an aforementioned polymer (A) as base polymer. The form of the coating composition is not particularly limited. For instance, it can be an aqueous emulsion-based composition in which the polymer (A) is dispersed in an aqueous solvent, a solvent-based composition in which the polymer (A) is dissolved in an organic solvent, etc. From the standpoint of the environmental hygiene, an aqueous emulsion-based coating composition is preferable. The following mainly describes the aqueous emulsion-based coating composition; however, the coating composition disclosed herein is not to be limited to the aqueous emulsion type.

In the aqueous emulsion-based coating composition, the aqueous solvent is water or a solvent mixture comprising water as the primary component (a component accounting for more than 50% by weight). The other solvent(s) forming the solvent mixture besides water can be one, two or more species selected from various water-miscible organic solvents (lower alcohols, etc.). In the aqueous solvent in this description, the water content is typically 90% by weight or higher, or preferably 95% to 100% by weight.

The coating composition disclosed herein can include various additives as desired. Examples of the additives include known thickener, thixotropic agent, dispersing agent, defoaming agent and inorganic powder. For instance, by adding various additives to an aqueous emulsion (polymerization reaction mixture) of polymer (A) obtained by emulsion polymerization as described above, an aqueous emulsion-based coating composition cam be prepared. Alternatively, as the coating composition, aqueous emulsion of the polymer (A) can be used as is or after pH adjustment (e.g. pH adjusted to about 6 to 8 by addition of ammonia water) and/or concentration adjustment (e.g. NV adjusted to about 40% to 60% by weight by addition of water).

Inorganic powder is included in the coating composition to form an inorganic powder-containing coating material. According to such a coating material, with the inorganic powder blocking light such as UV rays, photodegradation can be inhibited in the coating material itself as well as in the paint layer protected with the coating material. As the inorganic powder, oxides such as titanium dioxide, zinc oxide, magnesium oxide, alumina and silica; carbonates such as calcium carbonate; sulfates such as barium sulfate; and the like can be used. Inorganic powder capable of coloring the paint-protective coating material in white is preferable. With the white-colored paint-protective coating material, for instance, the temperature rise in sunlight can be reduced to better inhibit degradation of the coating material and the paint layer.

The amount of inorganic powder used to 100 parts by weight of polymer (A) can be, for instance, 0.5 part by weight or greater. From the standpoint of the light-blocking effect, it is suitably 1 part by weight or greater, preferably 2 parts by weight or greater, more preferably 3 parts by weight or greater, possibly 5 parts by weight or greater, 10 parts by weight or greater, 15 parts by weight or greater, 20 parts by weight or greater, 30 parts by weight or greater, 35 parts by weight or greater, or even 40 parts by weight or greater (e.g., 45 parts by weight or greater). The amount of inorganic powder used to 100 parts by weight of polymer (A) can be, for instance, 100 parts by weight or less. From the standpoint of the coating material's strength and ease of coating, it is suitably 80 parts by weight or less, advantageously 60 parts by weight or less, preferably 50 parts by weight or less, possibly 40 parts by weight or less, 30 parts by weight or less, 20 parts by weight or less, 15 parts by weight or less, or even 10 parts by weight or less.

In some preferable embodiments, the inorganic power comprises at least titanium dioxide ($TiO_2$). Titanium dioxide can also be used in combination with one, two or more species of other inorganic powder (e.g., calcium carbonate). The type of titanium dioxide is not particularly limited. For instance, titanium dioxide in any crystal form such as rutile, anatase and brookite can be used. In particular, rutile titanium dioxide is preferable. Titanium dioxide having coated particle surfaces can be used as well. The coating material of the titanium dioxide particles is not particularly limited. For instance, it can be an inorganic oxide such as silica, alumina and zinc oxide. Favorable examples include highly weather-resistant titanium dioxide (typically rutile titanium dioxide) having particle surfaces coated with Si—$Al_2O_3$, etc.

The amount of titanium dioxide used to 100 parts by weight of polymer (A) can be, for instance, 0.1 part by weight or greater. From the standpoint of the light-blocking effect, it is suitably 0.5 part by weight or greater, preferably 1 part by weight or greater, more preferably 2 parts by weight or greater, or possibly even 3 parts by weight or greater. The amount of titanium dioxide used to 100 parts by weight of polymer (A) is, for instance, possibly 30 parts by weight or less, suitably 20 parts by weight or less, preferably 15 parts by weight or less, possibly 10 parts by weight or less, or even 8 parts by weight or less.

The mean particle diameter of the inorganic powder is not particularly limited. For instance, from the standpoint of obtaining good light-blocking effect, the inorganic powder has a mean particle diameter of preferably 150 nm or greater, more preferably 180 nm or greater, possibly 220 nm or greater, or even 250 nm or greater. On the other hand, from the standpoint of the dispersity in resins, the mean particle diameter of the inorganic powder is suitably 3000 nm or less (e.g., 2000 nm or less), preferably 1500 nm or less, more preferably 1000 nm or less (e.g., 800 nm or less), possibly 500 nm or less, 400 nm or less, or even 350 nm or less. For instance, it is preferable to use titanium dioxide particles having a mean particle diameter of about 250 nm to 350 nm.

Thickener may help adjust the viscometric properties of the coating composition. As the thickener, known thickeners can be used such as urethane-based thickeners, cellulose-based thickeners, polyether-based thickeners and acrylic thickeners. For the thickener, solely one species or a combination of two or more species can be used.

Examples of commercial urethane-based thickeners include product names RHEOBYK-H 3300VF, RHEOBYK-T 1010 and RHEOBYK-L 1400 available from BYK; product names ADEKA NOL UH-450VF, ADEKA NOL UH-420, ADEKA NOL UH-462, ADEKA NOL UH-472, ADEKA NOL UH-540, ADEKA NOL UH-756VF and ADEKA NOL UH-814N available from ADEKA; and product names SN-THICKENER 612, SN-THICKENER 621N, SN-THICKENER 625N, SN-THICKENER 627N and SN-THICKENER 660T available from San Nopco, Ltd. In some embodiments, as the urethane-based thickener, a urethane associative thickener can be preferably used. Favorable examples of the urethane associative thickener include product names RHEOBYK-H 3300VF, RHEOBYK-T 1010 and RHEOBYK-L 1400 available from BYK; and product names ADEKANOL UH-450VF, ADEKANOL UH-420 and ADEKANOL UH-756VF available from ADEKA.

Examples of cellulose-based thickeners include hydroxyethyl cellulose, carboxymethyl cellulose and methyl cellulose. Examples of commercial products include product name SANHEC L available from Sansho Co., Ltd.

Examples of polyether-based thickeners include polyethylene glycol, polyether dialkyl esters, polyether dialkyl ethers and epoxidized polyether. Examples of commercial products include product name POLYOX WSR N-80 available from Dow Chemical Company.

Examples of acrylic thickeners include acrylate-based polymers such as sodium polyacrylate. Examples of commercial products include product names PRIMAL ASE-60, PRIMAL TT-615 and PRIMAL RM-5 available from Rohm and Haas Company; and product names SN-THICKENER 613, SN-THICKENER 618, SN-THICKENER 630, SN-THICKENER 634 and SN-THICKENER 636 available from San Nopco, Ltd.

The amount of thickener used is not particularly limited and can be suitably adjusted to obtain desirable viscometric properties. From the standpoint of reducing excessive influence on film properties, in some embodiments, the amount of thickener used to 100 parts by weight of polymer (A) is suitably 15 parts by weight or less, preferably 10 parts by weight or less, more preferably 5 parts by weight or less (e.g., 3 parts by weight or less), possibly 2.5 parts by weight or less, 2 parts by weight or less, 1.0 part by weight or less, or even 0.50 part by weight or less. The minimum amount of thickener used is not particularly limited. For instance, to 100 parts by weight of polymer (A), it can be 0.01 part by weight or greater, 0.05 part by weight or greater, 0.1 part by weight or greater (e.g., 0.10 part by weight or greater), or even 0.20 part by weight or greater.

Thixotropic agent may help adjust the viscometric properties of the coating composition. As the thixotropic agent, an inorganic material can be used, for instance, bentonite, modified bentonite, montmorillonite, hectorite, etc. For the thixotropic agent, solely one species or a combination of two or more species can be used.

The amount of thixotropic agent used is not particularly limited and can be suitably adjusted to obtain desirable viscometric properties. From the standpoint of reducing excessive influence on film properties, in some embodiments, the amount of thixotropic agent used to 100 parts by weight of polymer (A) is suitably 10 parts by weight or less, preferably 5 parts by weight or less, possibly 3 parts by weight or less, 2.5 parts by weight or less, or even 2 parts by weight or less. The minimum amount of thixotropic agent used is not particularly limited. For instance, to 100 parts by weight of polymer (A), it can be 0.01 part by weight or greater, 0.05 part by weight or greater, or even 0.1 part by weight or greater. Alternatively, no thixotropic agent may be used.

The thixotropic agent may also serve as a thickener. These thickener and thixotropic agent can be used together, or just one of them can be used. When using a thickener and thixotropic agent together, their combined amount used to 100 parts by weight of polymer (A) can be, for instance, 15 parts by weight or less, 10 parts by weight or less, 5 parts by weight or less, 4 parts by weight or less, 2.5 parts by weight or less, 1.5 parts by weight or less, or 1.0 part by weight or less; and 0.01 part by weight or greater, 0.05 part by weight or greater, 0.1 part by weight or greater (e.g., 0.10 part by weight or greater), or 0.20 part by weight or greater.

As for the method for applying the coating composition onto the paint layer of the object to be protected, it is possible to employ application with a coater such as a die coater and spray coater as well as roller coating, dip coating, etc. The die coating can be carried out by a coating system including a robot arm equipped with a slit die. For instance, by controlling the robot arm to extrude the coating composition into continuous liquid film (in ribbon form) while allowing the slit die to move along the shape of the object to be protected, even when the object has a non-flat shape (e.g., a complex three-dimensional shape such as an automobile body shell), the coating composition can be applied efficiently and precisely onto the object.

From the standpoint of increasing the efficiency and precision of coating material formation, the applied coating composition is preferably dried with heat. The drying temperature can be, for instance, about 40° C. to 100° C. and is typically preferably about 60° C. to 90° C.

While no particular limitations are imposed, from the standpoint of the ease of application and coating thickness management, etc., the non-volatile content (NV) of the coating composition is suitably about 25% to 75% by weight or preferably about 30% to 70% by weight (e.g., about 45% to 55% by weight). The NV can be adjusted through the amount of solvent (e.g., aqueous solvent) used. For instance, the NV of the coating composition can be adjusted through adjustment of the amount of water used in emulsion polymerization or addition of water after completion of emulsion polymerization.

The thickness of the paint-protective coating material is not particularly limited. From the standpoint of enhancing the protective effect, it is suitably 20 µm or greater. From the standpoint of the strength and removal workability, it is preferably 50 µm or greater, or more preferably 70 µm or greater (e.g., 85 µm or greater). The thickness of the coating material can be adjusted through the applied amount and NV of the coating composition. From the standpoint of the drying efficiency and sagging prevention of the applied composition, the thickness of the coating material is suitably 300 µm or less, preferably 200 µm or less, or more preferably 150 µm or less.

(Bh Viscosity)

In some embodiments, determined at 2 rpm using a BH viscometer, the coating composition has a viscosity $V_1$ of suitably 20 Pa·s or higher, preferably 40 Pa·s or higher, or more preferably 55 Pa·s or higher. With increasing viscosity $V_1$ determined at such a low shear rate, the anti-sag properties of the coating composition applied on the object to be protected (e.g., the anti-sag properties when applied to a vertical surface) tends to improve. On the other hand, from the standpoint of the defoaming properties and leveling properties of the coating composition, the coating composition's viscosity $V_1$ is suitably 200 Pa·s or lower, preferably 150 Pa·s or lower, or more preferably 100 Pa·s or lower (e.g., 80 Pa·s or lower).

Determined at 20 rpm using a BH viscometer, the coating composition has a viscosity $V_2$ which is not particularly limited and can be, for instance, about 5 Pa·s to 50 Pa·s. When the viscosity $V_2$ is in this range, an aforementioned $V_1$ value is likely to be obtained. The BH viscosity (viscosity determined with a BH viscometer) of the coating composition is determined with a BH viscometer at 30° C. at 2 and 20 rpm. The rotor used for the measurement is suitably selected according to the viscosity. For instance, it can be measured using rotor No. 6. When the use of rotor No. 6 is unsuitable, it can be measured with a suitable rotor number.

The ratio of the viscosity $V_1$ to the viscosity $V_2$ (or the "Ti value" hereinafter) is, for instance, possibly 2.0 or higher, suitably 3.0 or higher, or preferably 3.5 or higher. The Ti value is, for instance, possibly 9.0 or lower, preferably 8.0 or lower, more preferably 7.0 or lower, also possibly 6.0 or lower, or even 5.5 or lower. The coating composition having such a Ti value is likely to show applicability (ease of coating) suited for slot-die coating.

(Rheometer Viscosity)

In some embodiments, determined using a cone plate rheometer, the coating composition has a viscosity $V_3$ at a shear rate of 100 sec$^{-1}$ of preferably 1.0 Pa·s or higher, more preferably 1.3 Pa·s or higher, possibly 1.5 Pa·s or higher, 2.0 Pa·s or higher, or even 2.3 Pa·s or higher. When the viscosity $V_3$ determined at such a high shear rate is at least the prescribed values, the slot-die applicability (die-coating properties) can be increased. The maximum viscosity $V_3$ is not particularly limited. From the standpoint of the ease of combining with defoaming properties and ease of fluid feeding, it is suitably 15 Pa s or lower, preferably 10 Pa s or lower, possibly 8.5 Pa s or lower, or even 6.0 Pa s or lower. The rheometer viscosity (viscosity determined with a rheometer) of the coating composition can be determined by reading the viscosity at a shear rate of 100 sec$^{-1}$ from the viscosity measured at 30° C. while continuously changing the shear rate from 0.1 sec$^{-1}$ to 2000 sec$^1$, using a commercial rheometer (e.g., a rheometer viscometer RHEO STRESS 1 available from Haake Technik GmbH or a comparable product) with a cone rotor (cone diameter: 35 mm, cone angle: 0.5°)

This Description provides an aqueous emulsion in which a polymer (A) disclosed herein is dispersed and that can be used for producing a coating composition disclosed herein as a component thereof. To such an aqueous emulsion, as necessary, the aforementioned various components (e.g., thickener, inorganic powder, thixotropic agent) can be admixed to favorably produce the coating composition disclosed herein. Alternatively, the aqueous emulsion can be used as is as a coating composition.

This Description provides a paint protection method comprising the following: preparing a coating composition disclosed herein, applying the coating composition onto a paint layer of an object to be protected, and drying the coating composition to form a paint-protective coating material that temporarily protects the paint layer.

Figure 2:
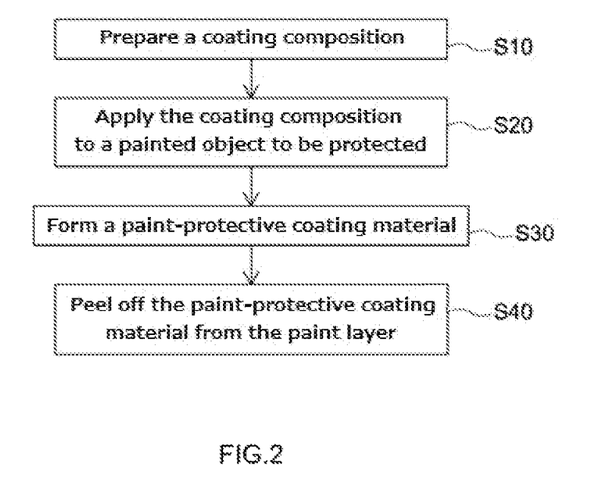
FIG. 2 shows a block chart illustrating an embodiment of the paint protection method according to this invention.

An embodiment of the paint protection method is described with reference to FIG. 2. In particular, a coating composition disclosed herein is prepared (step S10). The coating composition is applied (e.g., slot-die coated) onto a paint layer of an object to be protected (step S20). The applied coating composition is allowed to dry to form a paint-protective coating material that temporarily protects the paint layer (step S30). By thus providing the coating material onto the paint layer, the paint layer can be protected from damage and degradation. The coating material after serving the protective role is removed (e.g., peeled away) from the paint layer when desired (step S40).

The matters disclosed by this description include the following:

(1) A paint-protective coating material formed from a liquid coating composition, wherein     the coating composition comprises, as its base polymer, a polymer (A) that is a polymerization product of monomers comprising an acrylic monomer; and     the paint-protective coating material has     a storage modulus at 70° C. of 0.40 MPa or higher and 1.30 MPa or lower,     a storage modulus at 23° C. of 250 MPa or higher and 800 MPa or lower, and     a storage modulus at −30° C. of 2300 MPa or less.

(2) The paint-protective coating material according to (1) above, wherein the polymer (A) has a glass transition temperature of −20° C. or higher and 0° C. or lower, calculated based on the composition of the monomers forming the polymer (A).

(3) The paint-protective coating material according to (1) or (2) above, wherein the polymer (A) has an SP value of 10.0 (cal/cm$^3$)$^{1/2}$ or higher.

(4) The paint-protective coating material according to any of (1) to (3) above, wherein the monomers forming the polymer (A) comprise a N-containing monomer.

(5) The paint-protective coating material according to any of (1) to (4) above, wherein     the monomers forming the polymer (A) include a monomer ($m_T$) having a homopolymer glass transition temperature of 90° C. or higher and a monomer ($m_L$) having a homopolymer glass transition temperature of −30° C. or lower,     the monomer ($m_T$) comprises a N-containing monomer, and     the monomer ($m_T$) and the monomer ($m_L$) in the monomers have a molar ratio ($m_T/m_L$) of 0.60 or higher and 1.50 or lower.

(6) The paint-protective coating material according to (4) or (5) above, wherein the N-containing monomer comprises acrylonitrile.

(7) The paint-protective coating material according to any of (1) to (6) above, wherein the polymer (A) has an acid value of 15 mgKOH/g or less.

(8) The paint-protective coating material according to any of (1) to (7) above, wherein the monomers forming the polymer (A) comprise a carboxy group-containing monomer and an alkyl (meth)acrylate having an alkyl group with one to three carbon atoms at the ester terminal.

(9) The paint-protective coating material according to any of (1) to (8) above, wherein the coating composition is in aqueous emulsion form in which the polymer (A) is dispersed in an aqueous solvent.

(10) The paint-protective coating material according to any of (1) to (9) above, comprising a polyvinyl alcohol-based polymer.

(11) The paint-protective coating material according to any of (1) to (10) above, comprising a thickener.

(12) The paint-protective coating material according to any of (1) to (11) above, further comprising inorganic powder.

(13) The paint-protective coating material according to (12) above, wherein the inorganic powder comprises titanium dioxide.

(14) The paint-protective coating material according to any of (1) to (13) above, having a thickness of 20 μm or greater and 300 μm or less.

(15) A coating composition used for forming the paint-protective coating material according to any of (1) to (14) above.

(16) A coating composition comprising, as its base polymer, a polymer (A) that is a polymerization product of monomers comprising an acrylic monomer, wherein the coating composition forms a paint-protective coating material that satisfies the following conditions:

having a storage modulus at 70° C. of 0.40 MPa or higher and 1.30 MPa or lower, having a storage modulus at 23° C. of 250 MPa or higher and 800 MPa or lower, and having a storage modulus at −30° C. of 2300 MPa or less.

(17) The coating composition according to (16) above, wherein the polymer (A) has a glass transition temperature of −20° C. or higher and 0° C. or lower, calculated based on the composition of the monomers forming the polymer (A).

(18) The coating composition according to (16) or (17) above, wherein the polymer (A) has an SP value of 10.0 $(cal/cm^3)^{1/2}$ or higher.

(19) The coating composition according to any of (16) to (18) above, wherein the monomers forming the polymer (A) comprise a N-containing monomer.

(20) The coating composition according to any of (16) to (19) above, wherein the monomers forming the polymer (A) include a monomer ($m_T$) having a homopolymer glass transition temperature of 90° C. or higher and a monomer ($m_L$) having a homopolymer glass transition temperature of −30° C. or lower, with the monomer ($m_T$) comprising a N-containing monomer; and the monomer ($m_T$) and the monomer ($m_L$) in the monomers have a molar ratio ($m_T/m_L$) of 0.60 or higher and 1.50 or lower.

(21) The coating composition according to (19) or (20), wherein the N-containing monomer comprises acrylonitrile.

(22) The coating composition according to any of (16) to (21) above, wherein the polymer (A) has an acid value of 15 mgKOH/g or less.

(23) The coating composition according to any of (16) to (22) above, wherein the monomers forming the polymer (A) comprise a carboxy group-containing monomer and an alkyl (meth)acrylate having an alkyl group with one to three carbon atoms at the ester terminal.

(24) The coating composition according to any of (16) to (23) above, that is in aqueous emulsion form in which the polymer (A) is dispersed in an aqueous solvent.

(25) The coating composition according to any of (16) to (24) above, wherein the polymer (A) is a product of emulsion polymerization in the presence of a protective colloid.

(26) The coating composition according to (25) above, wherein the protective colloid is a polyvinyl alcohol-based polymer.

(27) The coating composition according to any of (16) to (26) above, further comprising a thickener.

(28) The coating composition according to any of (16) to (27) above, further comprising inorganic powder.

(29) The coating composition according to (28) above, wherein the inorganic powder comprises titanium dioxide.

(30) A paint protection method, the method comprising preparing the coating composition according to any of (16) to (29) above, applying the coating composition to a paint layer of an object to be protected, and drying the coating composition to form a paint-protective coating material that temporarily protects the paint layer.

(31) The paint protection method according to (30) above, wherein the coating composition is applied with a slot die.

EXAMPLES

Several working examples relating to the present invention are described below, but the present invention is not intended to be limited to these examples. In the description below, "parts" and "%" are by weight unless otherwise specified. The amounts of the respective materials used are based on active ingredients unless otherwise noted.

Experiment 1

<Preparation of Coating Compositions>

Example A1

Were mixed 66.3 parts (52 mol %) of n-butyl acrylate (BA), 15.8 parts (30 mol %) of acrylonitrile (AN), 17.9 parts (18 mol %) of methyl methacrylate (MMA), 0.05 part of n-lauryl mercaptan, 2 parts of sodium polyoxyethylene lauryl sulfate (product name LATEMUL E118B available from Kao Corporation) and 40 parts of ion-exchanged water. While purging with nitrogen, the mixture was emulsified with an emulsifying machine (homo-mixer) to prepare a monomer emulsion.

Into a reaction vessel equipped with a condenser, nitrogen inlet, thermometer and stirrer, was placed 50 parts of ion-exchanged water. To this, was added 1 part of an anionic modified polyvinyl alcohol (product name GOHSENX L-3266 available from Nihon Gosei Kako, Ltd.; saponification degree: 86.5-89.0 mol %), dissolved at room temperature while purging with nitrogen, and then heated to 60° C. To this, was added, as a polymerization initiator, 0.1 part of 2,2'-azobis[N-(2-carboxyethyl)-2-methylpropion amidine] hydrate (product name VA-057 available from Wako Pure Chemical industries, Ltd.). While keeping the liquid temperature around 60° C. in the reaction vessel, was added the monomer emulsion over three hours to carry out polymerization reaction. After completion of addition of the monomer emulsion, the reaction mixture was maintained and allowed to cure at the same temperature for three more hours. The system was allowed to cool to room temperature and then with addition of 10% ammonium water, it was adjusted to pH 7.5 to obtain an aqueous emulsion of polymer (A1) as the polymerization product of the monomers. The aqueous emulsion was used as the coating composition according to this Example.

Examples A2 to A11

The monomer species and amounts used were changed as shown in Table 1. Otherwise in the same manner as Example A1, were obtained aqueous emulsions (coating compositions) of polymers A2 to A11 according to the respective Examples. In Table 1, "VAc" represents vinyl acetate and "AA" acrylic acid.

<Measurements and Evaluations>

[Tensile Test]

Was horizontally held a painted steel plate with the painted face up, the steel plate coated with an acid epoxy crosslinked acrylic paint (product name KINO1210TW available from Kansai Paint Co., Ltd.). Onto the painted face (paint layer) of the painted steel plate, using an applicator available from TP Giken Co., Ltd., was applied the coating composition according to each Example and allowed to dry at 80° C. for three minutes to form a film (a paint-protective coating material). The coating composition was applied in an amount to obtain a thickness of 100 μm by non-volatiles. At room temperature, the resulting film was peeled from the painted steel plate and cut into a 25 mm wide and 100 mm long strip to prepare a measurement sample for tensile testing.

In an environment at 23° C. and 50% RH, the measurement sample was set in a tensile tester (system name TENSILON available from Shimadzu Corporation). Tensile tests were carried out at a reference line of 50 mm at a tensile speed of 0.3 m/min to determine the breaking strength (N/25 mm) and break elongation. The results are shown in Table 1.

[Determination of Storage Moduli]

Using the coating composition according to each Example, similar to the film preparation for the tensile testing, a 100 μm thick film was formed on the painted steel plate. At room temperature, the resulting film was peeled from the painted steel plate. Several sheets of this film were layered and united into one body with pressure applied to prepare an approximately 1 mm thick laminate film. Of the laminate film, was punched out a disc of 7.9 mm diameter and placed between parallel plates. While applying a shear strain at a frequency of 1 Hz using a rheometer (model name ARES G2 available from TA Instruments, Inc.), the viscoelasticity was measured in the shear mode over a temperature range of −70° C. to 150° C. at a heating rate of 5° C./min. At the respective temperatures, the storage moduli G' were determined. The results are shown in Table 1.

[Determination of Acid Value]

In the same manner as the film preparation for the tensile test, using the coating composition according to each Example, was formed a 100 μm thick film on the painted steel plate. At room temperature, the resulting film was removed from the painted steel plate. This was placed in chloroform and the resulting mixture was left still for 12 hours. Subsequently, the mixture was filtered. Using a mass having a weight average molecular weight of at least 10000 (determined by GPC) as a sample, the acid value was determined based on the potentiometric titration method specified in JIS K0070-1992. In particular, were mixed diethyl ether and ethanol at a 4:1 volume ratio. The sample was precisely weighed, added to 50 mL of the resulting solvent mixture, and completely dissolved. To this, was further added a phenol phthalein solution as an indicator to prepare a solution for measurement. With respect to the solution for measurement, potentiometric titration was carried out with a 0.1 mol/L potassium hydroxide ethanol solution. The inflection point of the resulting titration curve was used as the end point. The acid value was determined by the equation below. The results are shown in Table 1.

Acid value (mgKOH/g)=(B×F×5.611)/S

B: added volume (mL) of 0.1 mol/L potassium hydroxide ethanol solution at the end point.

F: 0.1 mol/L potassium hydroxide ethanol solution (1.0)

S: amount (g) of sample collected.

[Non-Marking Properties]

Using the coating composition according to each Example, similar to the film preparation for the tensile testing, a 100 μm thick film was formed around the center of the painted steel plate. Subsequently, the painted steel plate was placed into an incubator at 70° C. and stored for seven days. The painted steel plate was removed from the incubator and stored in an environment at 23° C. and 50% RH for at least 30 minutes. The film was then removed from the painted steel plate and the appearance of the paint layer where the film had been formed was visually observed. Based on the results, was evaluated the non-marking properties according to the three grades shown below. The higher the score, the better the non-marking properties. The results are shown in Table 1.

3 points: no marks observed 2 points: slight marks observed immediately after film removal, but disappearing naturally when left at room temperature 1 point: obvious marks observed and not disappearing even when left at room temperature.

[Removability (70° C.)]

To the painted steel plate, using an applicator available from TP Giken Co., Ltd., was applied the coating composition according to each Example and allowed to dry at 80° C. for three minutes to form a 100 μm thick film (a paint-protective coating material) on the painted steel plate. Subsequently, the painted steel plate was placed into an incubator at 70° C.; at this temperature, the film was removed from the painted steel plate and the removability was evaluated according to the following two grades:

3 points: film removable at 70° C.

1 point: film non-removable (resulting in stretching and tearing) at 70° C.

[Removability (23° C.)]

In the same manner as the evaluation of removability (70° C.), using the coating composition according to each Example, was formed a 100 μm thick film on the painted steel plate. In an environment at 23° C. and 50% RH, the film was removed from the painted steel plate and the removability was evaluated according to the following two grades:

3 points: film removable at 23° C.

1 point: film non-removable (resulting in stretching and tearing) at 23° C.

[Removability (−30° C.)]

In the same manner as the evaluation of removability (70° C.), using the coating composition according to each Example, was formed a 100 μm thick film on the painted steel plate. The film was placed into an incubator at −30° C.;

at this temperature, the film was removed from the painted steel plate and the removability was evaluated according to the following three grades:

3 points: film removable at −30° C.
2 points: film removable though rigid and hard to lift from the paint layer at −30° C.
1 point: film non-removable (resulting in stretching and tearing) at −30° C.

TABLE 1

| Example | | A1 | A2 | A3 | A4 | A5 | A6 | A7 | A8 | A9 | A10 | A11 |
|---|---|---|---|---|---|---|---|---|---|---|---|---|
| Monomers (mol %) | BA | 52 | 46 | 44 | 49 | 42 | 46 | 37 | 17 | 55 | 27 | 40 |
| | AN | 30 | 35 | 35 | 18 | 35 | 44 | | | 27 | | 27 |
| | Vac | | | | | | | 30 | 80 | | 40 | |
| | MMA | 18 | 18 | 18 | 30 | 18 | | 30 | | 15 | 30 | 30 |
| | AA | | 1 | 3 | 3 | 5 | 10 | 3 | 3 | 3 | 3 | 3 |
| | Total | 100 | 100 | 100 | 100 | 100 | 100 | 100 | 100 | 100 | 100 | 100 |
| SP value ((cal/cm$^3$)$^{1/2}$) | | 10.6 | 10.9 | 11.0 | 10.2 | 11.1 | 11.7 | 9.6 | 10.0 | 10.6 | 9.7 | 10.6 |
| Acid value (mgKOH/g) | | 0 | 4.8 | 13.9 | 14.1 | 24.1 | 48.0 | 14.0 | 14.2 | 14.0 | 14.0 | 14.0 |
| Storage moduli (MPa) | 70° C. | 0.49 | 0.82 | 1.02 | 0.68 | 1.23 | 1.00 | 0.84 | 1.14 | 0.31 | 1.32 | 1.56 |
| | 23° C. | 440 | 510 | 540 | 310 | 640 | 450 | 420 | 620 | 150 | 1100 | 970 |
| | −30° C. | 1300 | 1600 | 1700 | 1400 | 1800 | 1000 | 1500 | 2100 | 900 | 2900 | 2500 |
| Non-marking property score after 7 days at 70° C. | | 3 | 3 | 3 | 3 | 3 | 3 | 2 | 2 | 3 | 1 | 1 |
| Removability score | 70° C. | 3 | 3 | 3 | 3 | 3 | 3 | 3 | 3 | 1 | 3 | 3 |
| | 23° C. | 3 | 3 | 3 | 3 | 3 | 3 | 3 | 3 | 3 | 3 | 3 |
| | −30° C. | 3 | 3 | 3 | 3 | 3 | 3 | 3 | 2 | 3 | 1 | 1 |
| Tensile test at 23° C. | Elongation at break (%) | 330 | 260 | 250 | 310 | 180 | 280 | 270 | 230 | 420 | 12 | 48 |
| | Breaking strength (N/25 mm) | 22 | 34 | 36 | 26 | 38 | 30 | 35 | 33 | 16 | 42 | 40 |

As shown in Table 1, the films formed in Examples A1 to A8 all satisfied the prescribed G'(70), G'(23) and G'(−30), and showed good removability from the paint layer at the respective temperatures. These films all showed a level of non-marking properties with no practical problem. Among them, the films of Examples A1 to A6 showed good non-marking properties. On the other hand, the film of Example A9 was unremovable from the paint layer (painted steel plate) at 70° C. The films of Examples A10 and A11 were unremovable from the paint layer at −30° C. and showed poor non-marking properties.

By the aforementioned method, the films of Examples A1 to A8 were measured for peel strength on the painted steel plate and their breaking strength/peel strength ratios were calculated. The breaking strength/peel strength ratio was 7 for the film according to Example A7, and 10 or higher for all others. Among them, it was 35 or higher (within the range of 35 to 60) for Examples A2 to A4 (40 or higher (within the range of 40 to 60) for Examples A2 and A3).

Experiment 2
<Preparation of Coating Compositions>

Example B1

To the coating composition of Example A1 prepared in Experiment 1, for 100 parts of polymer A1 in the composition, were added a defoaming agent (product name DISPARLON AQ7533 available from Kusumoto Chemicals, Ltd.) and a thickener (product name ADEKA NOL UH-756VF, urethane-based associative thickener available from ADEKA) in the amounts shown in Table 2 to obtain a coating composition according to this Example.

Example B2

To the coating composition of Example A1 prepared in Experiment 1, for 100 parts of polymer A1 in the composition, were added titanium dioxide (product name TIPAQUE CR-95, rutile titanium dioxide available from Ishihara Sangyo Kaisha, Ltd.; mean particle diameter 280 nm), a dispersing agent (product name DISPERBYK-2015 available from BYK), a defoaming agent (product name DISPARLON AQ7533 available from Kusumoto Chemicals, Ltd.) and a thickener (product name ADEKA NOL UH-756VF, urethane-based associative thickener available from ADEKA) in the amount shown in Table 2 to obtain a coating composition according to this Example.

Example B3

To the coating composition of Example A1 prepared in Experiment 1, for 100 parts of polymer A1 in the composition, were added titanium dioxide (product name TIPAQUE CR-95, rutile titanium dioxide available from Ishihara Sangyo Kaisha, Ltd.; mean particle diameter 280 nm), calcium carbonate (product name SOFTON 3200 available from Shiraishi Calcium Kaisha, Ltd.), a dispersing agent (product name DISPERBYK-2015 available from BYK), a defoaming agent (product name DISPARLON AQ7533 available from Kusumoto Chemicals, Ltd.) and a thickener (product name ADEKA NOL UH-756VF, urethane-based associative thickener available from ADEKA) in the amount shown in Table 2 to obtain a coating composition according to this Example.

Examples B4 and B5

The amounts of calcium carbonate and dispersing agent were changed as shown in Table 2. Otherwise in the same manner as Example B3, were obtained coating compositions according to the respective Example.

Examples B7 to B9

In place of the coating composition of Example A1 prepared in Experiment 1, was used the coating composition of Example A3. Otherwise in the same manner as Examples B4 and B5, were obtained coating compositions according to the respective Examples.

The non-volatile content (NV) of each coating composition according to B1 to B9 was adjusted to 50% by suitably adjusting (diluting or concentrating) the water content.

Measurements and Evaluations

[Determination of Viscosity with BH Viscometer]

At 30° C., using a BH viscometer with a No. 6 rotor, the viscosity was measured at 2 rpm and at 20 rpm. From the results, was determined the Ti value (ratio of viscosity $V_1$ measured at 2 rpm to viscosity $V_2$ measured at 20 rpm). The results are shown in Table 2.

[Tensile Test]

In the same manner as Experiment 1, was prepared a measurement sample from the coating composition according to each Example and subjected to tensile testing to determine the breaking strength and elongation at break. The results are shown in Table 2.

[Determination of Storage Modulus]

In the same manner as Experiment 1, was prepared a measurement sample from the coating composition according to each Example and subjected to viscoelastic analysis to determine the storage moduli G' at the respective temperatures. The results are shown in Table 2.

[RSA-Tg]

By the viscoelastic analysis, the tan δ peak temperature was determined. Table 2 shows the temperature as RSA-Tg.

[Removability (70° C.)]

To the painted steel plate, using an applicator available from TP Giken Co., Ltd., was applied the coating composition according to each Example and allowed to dry at 80° C. for three minutes to form a 100 μm thick film (a paint-protective coating material) on the painted steel plate. Subsequently, the painted steel plate was placed into an incubator at 70° C.; at this temperature, the film was removed from the painted steel plate and the removability was evaluated according to the following two grades:
3 points: film removable
1 point: film non-removable (resulting in stretching and tearing)

[Removability (23° C.)]

In the same manner as the evaluation of removability (70° C.), using the coating composition according to each Example, was formed a 100 μm thick film on the painted steel plate. In an environment at 23° C. and 50% RH, the film was removed from the painted steel plate and the removability was evaluated according to the following two grades:
3 points: film removable
1 point: film non-removable (resulting in stretching and tearing)

[Removability (−30° C.)]

In the same manner as the evaluation of removability (70° C.), using the coating composition according to each Example, was formed a 100 μm thick film on the painted steel plate. The film was placed into an incubator at −30° C.; at this temperature, the film was removed from the painted steel plate and the removability was evaluated according to the following three grades:
3 points: film removable
2 points: film removable though rigid and hard to lift from the paint layer
1 point: film non-removable (resulting in stretching and tearing)

[Non-Marking Properties]

Using the coating composition according to each Example, non-marking properties were evaluated in the same manner as Experiment 1. Table 2 shows the results evaluated according to the same three grades as Experiment 1.

TABLE 2

| | Example | | B1 | B2 | B3 | B4 | B5 | B6 | B7 | B8 | B9 |
|---|---|---|---|---|---|---|---|---|---|---|---|
| Composition (parts) | Base polymer | A1 | 100 | 100 | 100 | 100 | 100 | 100 | — | — | — |
| | | A3 | — | — | — | — | — | — | 100 | 100 | 100 |
| | Titanium dioxide | | — | 5 | 5 | 5 | 5 | 5 | 5 | 5 | 5 |
| | Calcium carbonate | | — | — | 20 | 45 | 70 | 95 | — | 45 | 70 |
| | Dispersing agent | | — | 0.1 | 0.5 | 1 | 1.5 | 2 | 0.1 | 1 | 2 |
| | Defoaming agent | | 1 | 1 | 1 | 1 | 1 | 1 | 1 | 1 | 1 |
| | Thickener | | 0.25 | 0.25 | 0.25 | 0.25 | 0.25 | 0.25 | 0.25 | 0.25 | 0.25 |
| Measurements & Evaluations | BH viscosity (Pa · s) | 2 rpm ($V_1$) | 50 | 51 | 54 | 58 | 59 | 60 | 49 | 55 | 58 |
| | | 20 rpm ($V_2$) | 12 | 12 | 12 | 12 | 12 | 12 | 12 | 12 | 12 |
| | Ti value (V1/V2) | | 4.2 | 4.3 | 4.5 | 4.8 | 4.9 | 5.0 | 4.1 | 4.6 | 4.8 |
| | Storage moduli (MPa) | 70° C. | 0.44 | 0.48 | 0.64 | 0.78 | 1.45 | 2.71 | 1.02 | 1.29 | 1.85 |
| | | 23° C. | 420 | 440 | 630 | 710 | 870 | 1010 | 540 | 740 | 890 |
| | | −30° C. | 1300 | 1400 | 1800 | 2200 | 2500 | 3500 | 1700 | 2300 | 3000 |
| | RSA-Tg (° C.) | | 36 | 36 | 36 | 37 | 37 | 38 | 39 | 40 | 40 |
| | Peel strength (N/25 mm) after 7 days at 70° C. | | 0.7 | 0.7 | 0.5 | 0.4 | 0.3 | 0.3 | 0.8 | 0.4 | 0.3 |
| | Removability score | 70° C. | 3 | 3 | 3 | 3 | 3 | 3 | 3 | 3 | 3 |
| | | 23° C. | 3 | 3 | 3 | 3 | 3 | 3 | 3 | 3 | 3 |
| | | −30° C. | 3 | 3 | 3 | 2 | 1 | 1 | 3 | 2 | 1 |
| | Non-marking property score after 7 days at 70° C. | | 3 | 3 | 3 | 3 | 1 | 1 | 3 | 3 | 1 |
| | Tensile test at 23° C. | Elongation at break (%) | 350 | 330 | 300 | 260 | 170 | 110 | 260 | 200 | 120 |
| | | Breaking strength (N/25 mm) | 22 | 24 | 25 | 22 | 18 | 15 | 36 | 28 | 23 |

As shown in Table 2, at the respective temperatures, the films formed in Examples B1 to B4, B7 and B8 all showed good removability from the paint layer and had excellent non-marking properties. On the other hand, the films of Examples B5, B6 and B9 were unremovable from the paint layer and showed poor non-marking properties at −30° C.

Although specific embodiments of the present invention have been described in detail above, these are merely for illustrations and do not limit the scope of the claims. The art according to the claims includes various modifications and changes made to the specific embodiments illustrated above.

INDUSTRIAL APPLICABILITY

The paint-protective coating material provided by the art according to this Description is suitable as a paint-protective coating material used in an embodiment where it is provided onto a paint layer of an object to be protected to serve a role to protect the paint layer from damage such as scratches and dirt and from degradation, and removed from the protected object after such a protective role is completed. Examples of possible objects to be protected include painted metal plates (steel plates, stainless steel plates, aluminum plates, etc.) having paint layers on the surface (e.g., painted steel plates used for house building materials, other building materials, transportation equipment such as watercrafts, railroad vehicles and automobiles, etc.), painted synthetic resin plates and articles molded from these. The paint-protective coating material can be preferably used for applications where it is provided onto paint layers of objects to be protected (articles having paint layers formed by paint works, e.g., metal plates such as steel plates and molded articles thereof) and protects the paint layers, with the objects having been provided with paint works using paints of various compositions such as acrylic paints, polyester-based paints, alkyd-based paints, melamine-based paints, urethane-based paints, acid-epoxy crosslinked paints, and their composites (e.g., acrylic melamine-based paints, alkyd melamine-based paints, etc.).

REFERENCE SIGNS LIST 10 paint-protective coating material
20 object to be protected
22 paint layer

The invention claimed is:

1. A paint-protective coating material, wherein
the paint-protective coating material is formed from a coating composition in liquid form,
the coating composition comprises, as a base polymer, a polymer (A) that is a polymerization product of monomers comprising an acrylic monomer; and
the paint-protective coating material has
a storage modulus at 70° C. of 0.40 MPa or higher and 1.30 MPa or lower,
a storage modulus at 23° C. of 250 MPa or higher and 800 MPa or lower, and
a storage modulus at −30° C. of 2300 MPa or less.

2. The paint-protective coating material according to claim 1, wherein the polymer (A) has an SP value of 10.0 $(cal/cm^3)^{1/2}$ or higher.

3. The paint-protective coating material according to claim 1, wherein the monomers forming the polymer (A) comprise a nitrogen-atom-containing monomer.

4. The paint-protective coating material according to claim 3, wherein
the monomers forming the polymer (A) include a monomer ($m_T$) having a homopolymer glass transition temperature of 90° C. or higher and a monomer ($m_L$) having a homopolymer glass transition temperature of −30° C. or lower, with the monomer ($m_T$) comprising a N-containing monomer; and
the monomer ($m_T$) and the monomer ($m_L$) in the monomers have a molar ratio ($m_T/m_L$) of 0.60 or higher and 1.50 or lower.

5. The paint-protective coating material according to claim 3, wherein the N-containing monomer comprises acrylonitrile.

6. The paint-protective coating material according to claim 1, wherein the polymer (A) has a glass transition temperature of −20° C. or higher and 0° C. or lower, calculated based on a composition of the monomers forming the polymer (A).

7. A coating composition used for forming the paint-protective coating material according to claim 1.

8. The coating composition according to claim 7, that is in aqueous emulsion form in which the polymer (A) is dispersed in an aqueous solvent.

9. A paint protection method, the method comprising
preparing the coating composition according to claim 7,
applying the coating composition to a paint layer of an object to be protected, and
drying the coating composition to form a paint-protective coating material that temporarily protects the paint layer.

10. The paint protection method according to claim 9, wherein the coating composition is applied with a slot die.

* * * * *